(12) United States Patent
Nurishi

(10) Patent No.: US 6,987,622 B2
(45) Date of Patent: Jan. 17, 2006

(54) ZOOM LENS AND IMAGE TAKING SYSTEM

(75) Inventor: Ryuji Nurishi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/980,342

(22) Filed: Nov. 4, 2004

(65) Prior Publication Data

US 2005/0122595 A1    Jun. 9, 2005

(30) Foreign Application Priority Data

Nov. 6, 2003  (JP)  .............................. 2003-376925
Nov. 17, 2003  (JP)  .............................. 2003-386906

(51) Int. Cl.
*G02B 15/14* (2006.01)
(52) U.S. Cl. ...................... 359/684; 359/688; 359/765;
359/683; 359/685; 359/686; 359/740; 359/763;
359/774; 359/775
(58) Field of Classification Search ................ 359/676,
359/683–686, 688, 740, 763, 765, 774, 775
See application file for complete search history.

(56) References Cited

U.S. PATENT DOCUMENTS

| | | | | |
|---|---|---|---|---|
| 5,056,900 A | | 10/1991 | Mukaiya et al. ............. | 359/676 |
| 5,388,004 A | | 2/1995 | Adachi ....................... | 359/683 |
| 5,764,420 A | * | 6/1998 | Yahagi ........................ | 359/682 |
| 5,898,525 A | * | 4/1999 | Suzuki ........................ | 359/684 |
| 5,966,246 A | * | 10/1999 | Yoshikawa ................... | 359/686 |
| 5,991,092 A | * | 11/1999 | Tsutsumi ..................... | 359/684 |
| 6,002,527 A | * | 12/1999 | Ohtake ........................ | 359/683 |
| 6,002,528 A | * | 12/1999 | Tomita ........................ | 359/684 |
| 6,038,082 A | * | 3/2000 | Takatsuki .................... | 359/688 |
| 6,055,114 A | * | 4/2000 | Ohtake ........................ | 359/676 |
| 6,215,599 B1 | * | 4/2001 | Ohtake ........................ | 359/688 |
| 6,278,559 B1 | * | 8/2001 | Yahagi ........................ | 359/683 |
| 6,282,032 B1 | | 8/2001 | Tomita ........................ | 359/687 |
| 6,456,441 B2 | | 9/2002 | Hoshi ........................... | 359/687 |
| 6,490,096 B2 | * | 12/2002 | Miyano ....................... | 359/684 |
| 6,674,581 B2 | * | 1/2004 | Miyano ....................... | 359/688 |
| 6,718,132 B2 | * | 4/2004 | Nishina ....................... | 396/72 |
| 2001/0038495 A1 | | 11/2001 | Hoshi ........................... | 359/687 |

(Continued)

FOREIGN PATENT DOCUMENTS

EP   1 306 711 A1   5/2003

(Continued)

OTHER PUBLICATIONS

U.S. Appl. No. 10/972,427, filed Oct. 26, 2004, Ryuji Nurishi, Pending.

*Primary Examiner*—Evelyn A. Lester
(74) *Attorney, Agent, or Firm*—Fitzpatrick, Cella, Harper & Scinto

(57) ABSTRACT

There is disclosed a zoom lens having small variations of aberration and field angle during focusing and having a small system as a whole. The zoom lens includes a first lens unit having a positive optical power, a second lens unit having a negative optical power, a third lens unit having a negative optical power, a fourth lens unit having a positive optical power, and a fifth lens unit having a positive optical power, in order from an object side to an image side. During zooming, the second lens unit and third lens unit are moved, and during focusing, the fifth lens unit is moved. The fifth lens unit consists of one negative lens element and two positive lens elements in order from the object side to the image side, and the following conditions are satisfied:

$0 < \alpha 5 < 0.35$ $1.85 < v5p/v5n$.

21 Claims, 19 Drawing Sheets

U.S. PATENT DOCUMENTS

| | | | |
|---|---|---|---|
| 2002/0181120 A1 * | 12/2002 | Nagahara | 359/683 |
| 2003/0007256 A1 * | 1/2003 | Usui et al. | 359/686 |
| 2004/0223232 A1 * | 11/2004 | Takatsuki | 359/684 |
| 2005/0122595 A1 * | 6/2005 | Nurishi | 359/684 |

FOREIGN PATENT DOCUMENTS

| | | |
|---|---|---|
| JP | 62-247316 | 10/1987 |
| JP | 62-43286 Y2 | 11/1987 |
| JP | 2-118510 | 5/1990 |
| JP | 2-208618 | 8/1990 |
| JP | 3-123310 | 5/1991 |
| JP | 3-145615 | 6/1991 |
| JP | 4-138407 | 5/1992 |
| JP | 5-215967 | 8/1993 |
| JP | 8-146295 | 6/1996 |
| JP | 2561637 B2 | 12/1996 |
| JP | 11-305124 | 11/1999 |
| JP | 2001-21803 | 1/2001 |
| JP | 2001-194586 | 7/2001 |
| JP | 2001-343583 | 12/2001 |
| WO | WO 01/92941 A1 | 12/2001 |

* cited by examiner

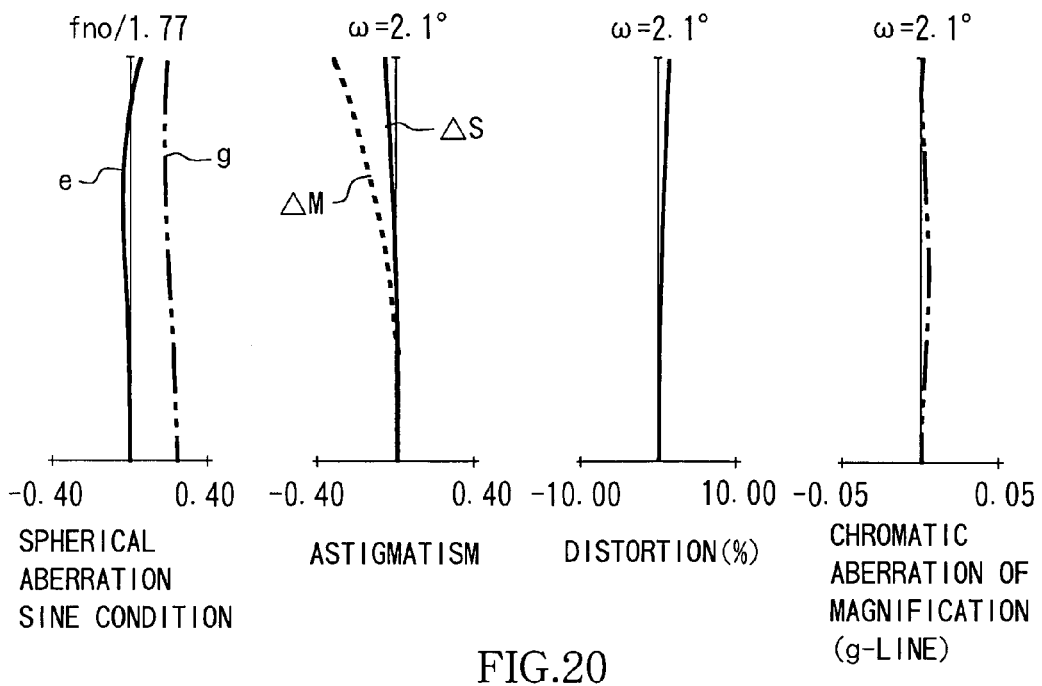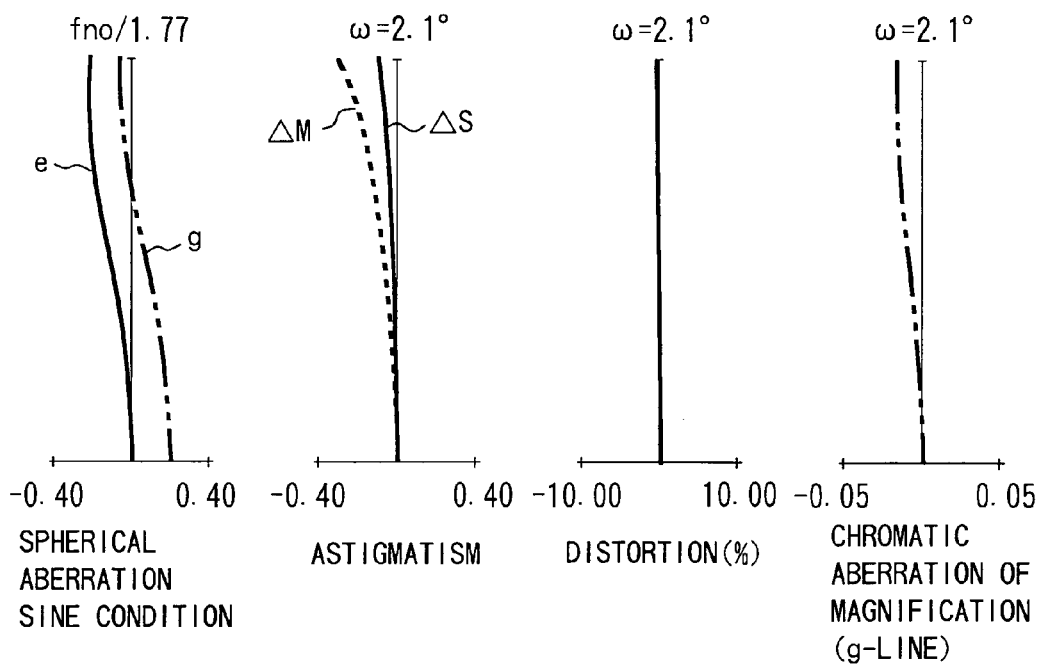

ZOOM LENS AND IMAGE TAKING SYSTEM

BACKGROUND OF THE INVENTION

1. Field of the Invention

The present invention relates to a zoom lens, and more particularly, to a zoom lens suitable for an image-taking system such as an electronic camera (such as a video camera, or a digital still camera, etc.), a film camera, a broadcasting camera, etc.

2. Description of the Related Art

In zoom lenses used for image-taking systems (image-taking apparatuses) such as television cameras, video cameras, etc., there is an increasing demand for a large aperture ratio, a large zoom ratio, and a wide field angle, in addition to being a small-size lens system as a whole.

Among the zoom lenses, four lens units including, in order from an object side to an image side, a first lens unit (focus lens unit) having a positive refractive power for focusing, a second lens unit (zoom lens unit) having a negative refractive power for zooming, a third lens unit (compensation lens unit) having a positive or negative refractive power for correcting for the variation of image surface during zooming, an aperture stop, and a fourth lens unit (relay lens unit) having a positive refractive power for forming an image is disclosed, for example, in Patent Documents 1 to 5.

A front focusing type arranged focus lens unit closer to the object side than the zoom lens unit is more advantageous for a manual focusing type, since the amount of movement of the focus lens unit does not vary even during zooming when an object distance is constant. For this reason, the front focusing types are widely employed in broadcasting zoom lens or in commercially used zoom lens which requires many manual operations.

A rear focusing type arranged focus lens unit closer to the image side than the zoom lens unit is widely employed in auto focusing zoom lens type, since it is advantageous for decreasing the size and weight of the focus lens unit.

In view of this point, in the zoom lens which comprises four lens units having positive, negative, negative, and positive refractive powers, there is known a zoom lens in which a lens unit closer to the image side than the zoom lens unit is moved during auto focusing operation and a lens unit closer to the object side than the zoom lens unit is moved during manual focusing operation. (For example, see Patent Document 6.)

In addition, as a zoom lens including five lens units, that is, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, there is known a rear focusing type zoom lens in which the zooming is performed from the wide-angle end to the telephoto end by moving the second lens unit to the image side. Also, the variation of image surface due to the zooming is corrected by moving the fourth lens unit, and the focusing operation is performed by moving the fourth lens unit. (For example, see Patent Document 7.)

Furthermore, as a zoom lens including five lens units, that is, in order from the object side to the image side, a first lens unit having a positive refractive power and being fixed during zooming, a second lens unit, used for zooming, having a negative refractive power, a third lens unit having a positive refractive power, a fourth lens unit having a negative refractive power, and a fifth lens unit having a positive refractive power and correcting the variation of image surface caused by the zooming, there is known a rear focusing type zoom lens in which at least one of the third lens unit and the fourth lens unit is moved during the zooming and the fifth lens unit is moved during focusing operation. (For example, see Patent Document 8.)

Patent Document 1: Japanese Patent Application Laid-open No. H2-118510.

Patent Document 2: Japanese Patent Application Laid-open No. H2-208618.

Patent Document 3: Japanese Patent Application Laid-open No. H3-123310.

Patent Document 4: Japanese Patent Application Laid-open No. H3-145615.

Patent Document 5: Japanese Patent Application Laid-open No. H4-138407.

Patent Document 6: Japanese Utility Model Registration Publication No. S62-43286.

Patent Document 7: Japanese Patent Application Laid-open No. H8-146295.

Patent Document 8: Japanese Patent Application Laid-open No. H5-215967.

In the zoom lens disclosed in Patent Documents 1 to 5, the fourth lens unit has one negative lens element and two positive lens elements, in order from the object side to the image side. However, since the incident reduced tilt angle $\alpha 4$ of the axial ray to the fourth lens unit is large, variation of an incident height $h4$ of the axial ray becomes large during focusing operation with the fourth lens unit, such that variations of axial aberrations such as spherical aberration, longitudinal chromatic aberration, etc., tend to increase.

In addition, in the zoom lens disclosed in Patent Document 6, the fourth lens unit has one negative lens element and two positive lens elements, in order from the object side to the image side. However, since an Abbe's number $v4n$ of a material of the negative lens element and Abbe's numbers $v4p$ of materials of the positive lens elements are close each other, the curvatures of the respective lens elements in the fourth lens unit are increased, thereby increasing the off-axial aberration during focusing operation. Also, because the weight of the fourth lens unit is increased and because a larger driving power for focusing operation is needed, the power consumption or the size of a driving mechanism tends to be increased.

In addition, since the refractive power of the fourth lens unit is repressed and small, a new lens unit having a positive refractive power for converging the light flux diverging from the third lens unit must be arranged closer to the object side than the aperture stop. Further, in order to alleviate the degree of divergence of the light flux from the third lens unit, the refractive power of the third lens unit must be reduced. As a result, the amount of movement of the third lens unit during zooming tends to be increased, such that the total length of the zoom lens tends to be increased.

Further, a zoom lens of the rear focusing type is also disclosed, for example, in Patent Documents 9 to 13.

Patent Document 9: Japanese Patent Application Laid-open No. 2001-21803.

Patent Document 10: Japanese Patent Application Laid-open No. 2001-343583.

Patent Document 11: Japanese Patent Application Laid-open No. H11-305124

Patent Document 12: Japanese Patent Application Laid-open No. 2001-194586.

Patent Document 13: Japanese Patent No. 2561637.

At a zoom position with a focal length f of a zoom lens unit, let us define an image-forming point as being i0 when an object is at infinity and the image-forming point as being i(obj) when an object distance is obj. Then, the variation amount Δsk=i(obj)−i0 of the image-forming point when the object distance is varied is expressed by the following expression from a Newton's formula:

$$\Delta sk = f^2/(obj-f) \quad (1)$$

Therefore, when the focusing operation is performed with a partial system B1 closer to the object side than the zoom lens unit, the variation amount ΔskB1 of the image-forming point at the object distance obj is expressed by the following expression:

$$\Delta skB1 = fB1^2/(obj-fB1) \quad (2)$$

and it is constant regardless of the zoom position (variation of magnification). Therefore, a movement amount ΔxFF during focusing operation of a partial system (focus lens unit) FF of the partial system B1 is not varied regardless of a zoom state.

However, when the focusing operation is performed with a lens unit closer to the image side than the zoom lens unit, the displacement ΔskB1 of the image-forming point in the partial system B1 is increased or decreased by a partial system B2 which is a zoom lens unit, and as a result, the displacement ΔskB2 can be approximately expressed by the following expression:

$$\Delta skB2 = \{fB1^2/(obj-fB1)\}\cdot\beta B2^2 \quad (3)$$

Therefore, when the focusing operation is performed with a partial system FR in the partial system B3 which is the lens unit closer to the image side than the zoom lens unit, the movement amount ΔxFR of the partial system FR is increased proportionally to the square of the image-forming magnification βB2 of the zoom lens unit. Therefore, as the zoom ratio is increased, the movement amount of the partial system FR during focusing operation is increased and the space for moving the partial system FR is increased. Thus the driving power for moving the partial system FR by a desired amount is also increased, thereby increasing the overall size of the zoom lens.

The zoom lens disclosed in Patent Document 12 described above is comprised four lens units including lens units having positive, negative, positive, and positive refractive powers, in order from the object side to the image side, and since the fourth lens unit is shared for use as a compensator (for correcting for the movement of image surface due to the zooming) and for use of focusing operation, there is a problem in that the zoom operation cannot be performed manually.

The zoom lens disclosed in Patent Document 6 is a zoom lens including four lens units having positive, negative, negative, and positive refractive powers, in order from the object side to the image side, and the first lens unit is used for the manual focusing operation, the second lens unit is used as a variator (zoom lens unit), the third lens unit is used as a compensator (image surface-movement correcting unit), and the lens unit closer to the image side than the fourth lens unit is used as the focus lens unit for auto focusing operation.

The zoom lens disclosed in Patent Document 6 has a relatively small zoom ratio of 6 times or less, and the focal length at the zoom position of the telephoto end is relatively short, more or less 70 mm. For this reason, if the zoom ratio is further increased and if the focal length at the telephoto end is increased, the movement amount of the lens unit closer to the image side than the fourth lens unit is rapidly increased during focusing operation, so that there is a problem in that the whole zoom lens is large-sized.

SUMMARY OF THE INVENTION

It is an object of the present invention to provide a zoom lens having a small variation of aberration and a small variation of field angle during focusing operation and having a small size as a whole and an image-taking system having the zoom lens.

Further, it is another object of the present invention to provide a zoom lens having a high zoom ratio, having a small size as a whole by decreasing the maximum movable amount of a focus lens unit, and having high optical performance over a whole object distance range, and an image-taking system having the zoom lens.

According to an aspect of the present invention, there is provided a zoom lens comprising, in order from an object side to an image side, a first lens unit having a positive optical power, a second lens unit having a negative optical power, a third lens unit having a negative optical power, a fourth lens unit having a positive optical power, and a fifth lens unit having a positive optical power. Further, the second lens unit and the third lens unit are moved during zooming and the fifth lens unit is moved during focusing. The fifth lens unit consists of one negative lens element G51 and two positive lens elements G52 and G53 in order from the object side to the image side, and the following conditional expressions are satisfied:

$$0 < \alpha 5 < 0.35$$

$$1.85 < \nu 5p/\nu 5n$$

where α5 represents an incident reduced tilt angle of an axial marginal ray to the fifth lens unit in a case where it is normalized to an optical power φw at a wide-angle end of the whole zoom lens, ν5p represents an average value of Abbe's numbers of materials of the positive lens elements G52 and G53, ν5n is an Abbe's number of a material of the negative lens element G51.

In addition, according to another aspect of the present invention, there is provided a zoom lens comprising, in order from an object side to an image side, a first lens unit having a positive optical power, a second lens unit having a negative optical power, a third lens unit having one of positive and negative optical powers, and a fourth lens unit having a positive optical power. And, the second lens unit and the third lens unit are moved during zooming The fourth lens unit has a 4a lens sub-unit, a 4b lens sub-unit, and a 4c lens sub-unit, in order from the object side to the image side. Focusing is performed by moving the 4b lens sub-unit. In addition, the following conditional expression is satisfied:

$$1 < |\beta 4c|$$

where β4c represents an image-forming magnification of the 4c lens sub-unit.

Features of the zoom lens and the image-taking system according to the present invention will be clarified from descriptions of the following specific embodiments referring to the drawings.

BRIEF DESCRIPTION OF THE DRAWINGS

FIG. 19 shows aberration diagrams of the zoom lens according to Numerical Example 3 when f=111.5 mm and the object distance is at infinity.

FIG. 20 shows aberration diagrams of the zoom lens according to Numerical Example 3 when f=111.5 mm and the object distance is 0.5 m.

DETAILED DESCRIPTION OF THE PREFERRED EMBODIMENTS

Hereinafter, embodiments of the present invention will be described with reference to the drawings.

Figure 1:
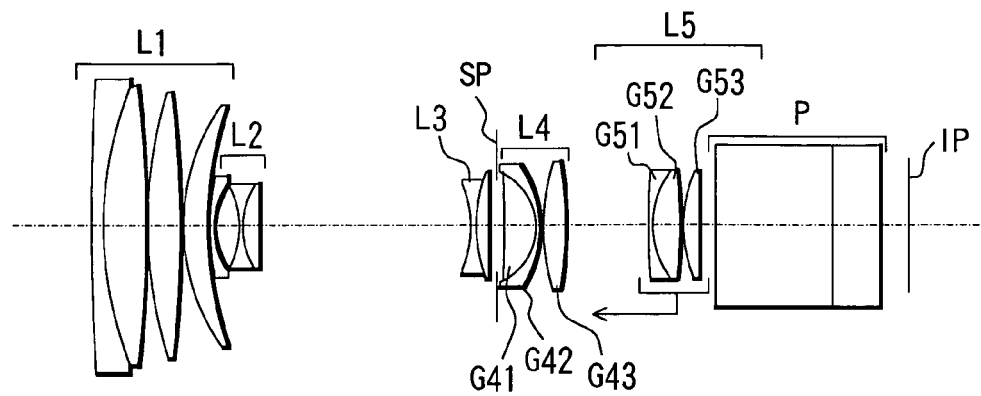
FIG. 1 shows a cross-sectional view of a zoom lens according to Embodiment 1 (Numerical Example 1) of the present invention at a wide-angle end.

FIG. 1 shows a cross-sectional view of a zoom lens at a wide-angle end according to Embodiment 1 (Numerical Example 1) of the present invention of the zoom lens.

Figure 2:
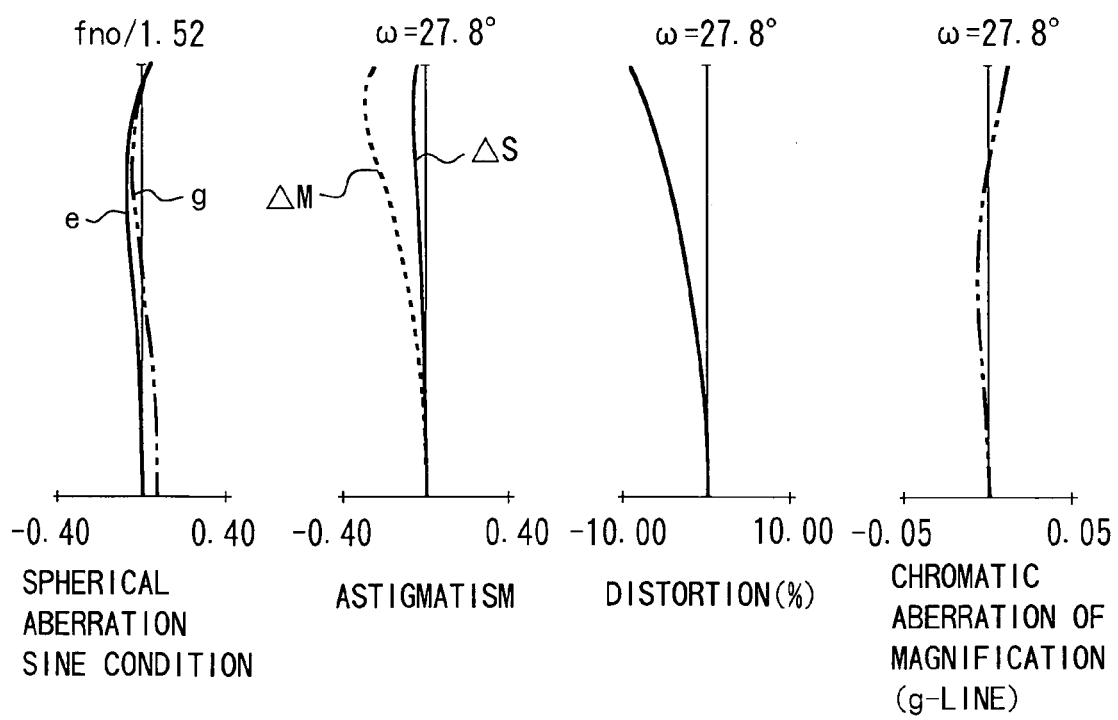
FIG. 2 shows aberration diagrams of the zoom lens according to Numerical Example 1 when f=7.6 mm and an object distance is 2.5 m.
Figure 3:
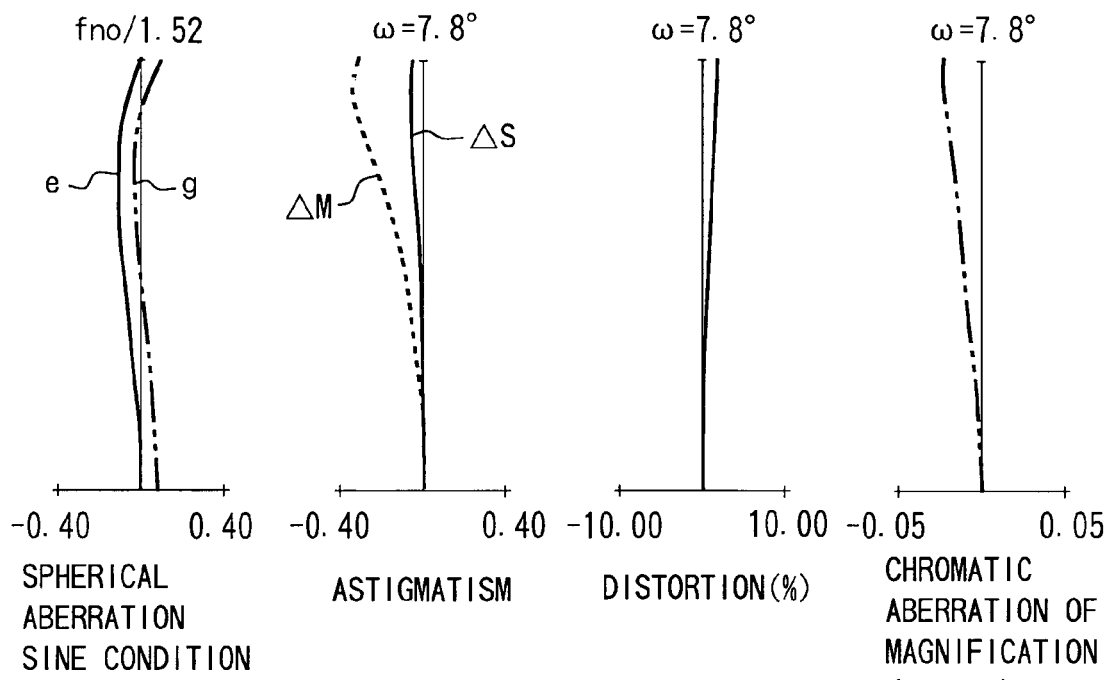
FIG. 3 shows aberration diagrams of the zoom lens according to Numerical Example 1 when f=29.1 mm and the object distance is 2.5 m.
Figure 4:
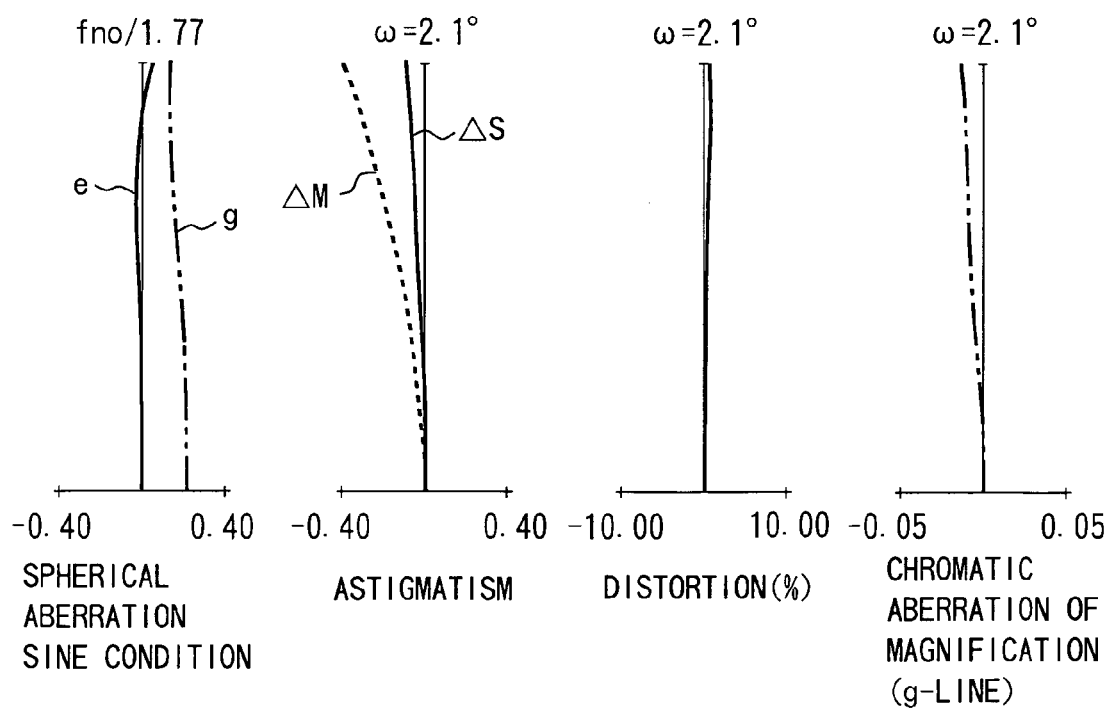
FIG. 4 shows aberration diagrams of the zoom lens according to Numerical Example 1 when f=111.5 mm and the object distance is 2.5 m.
Figure 5:
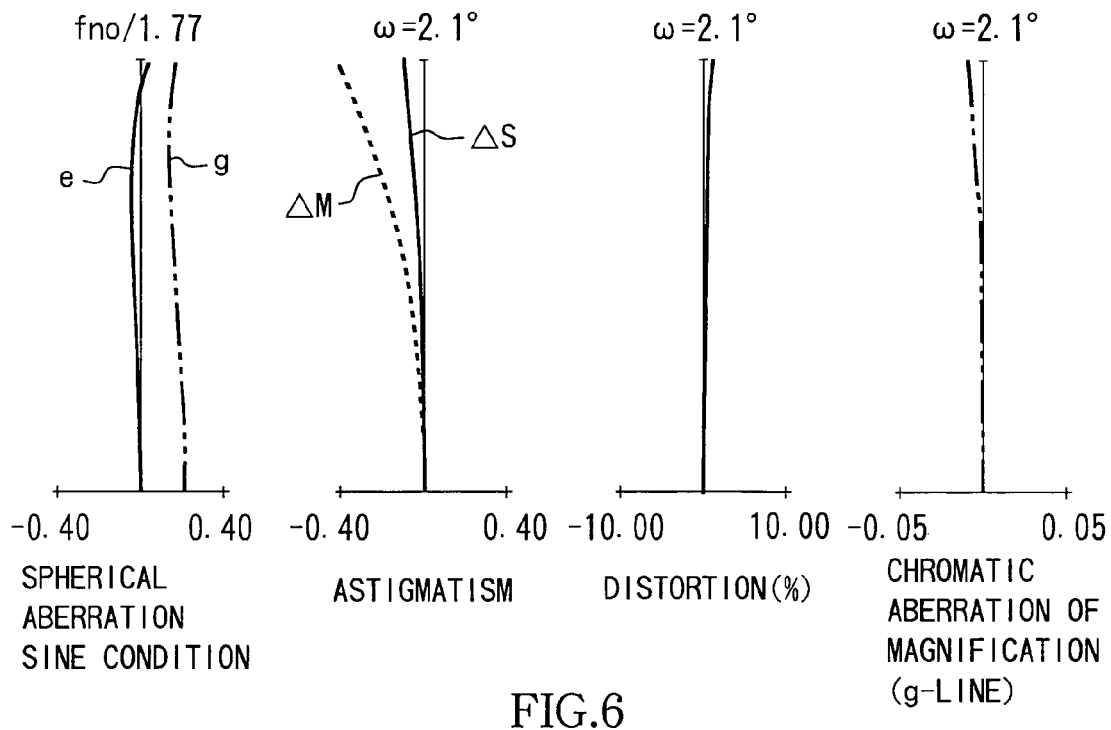
FIG. 5 shows aberration diagrams of the zoom lens according to Numerical Example 1 when f=111.5 mm and the object distance is at infinity.
Figure 6:
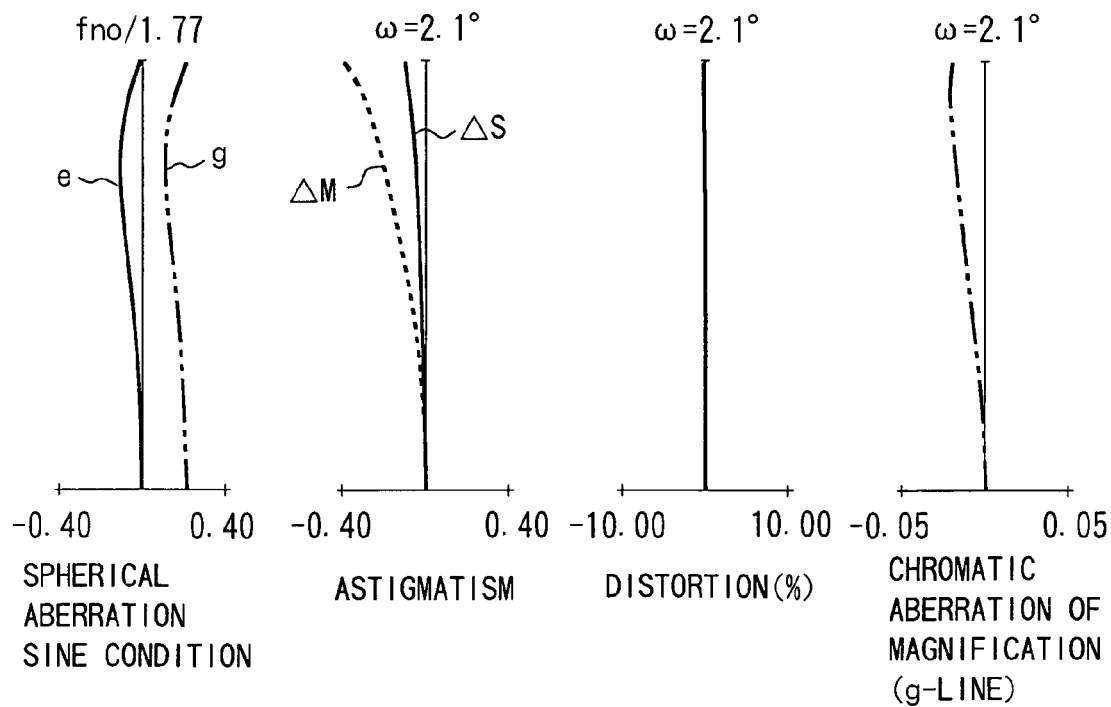
FIG. 6 shows aberration diagrams of the zoom lens according to Numerical Example 1 when f=111.5 mm and the object distance is 0.5 m.

FIG. 2 shows aberration diagrams of the zoom lens according to Embodiment 1 when f=7.6 mm and an object distance is 2.5 m, FIG. 3 shows aberration diagrams of the zoom lens according to Embodiment 1 when f=29.1 mm and the object distance is 2.5 m, FIG. 4 shows aberration diagrams of the zoom lens according to Embodiment 1 when f=111.5 mm and the object distance is 2.5 m, FIG. 5 shows aberration diagrams of the zoom lens according to Embodiment 1 when f=111.5 mm and the object distance is at infinity, and FIG. 6 shows aberration diagrams of the zoom lens according to Embodiment 1 when f=111.5 mm and the object distance is 0.5 m.

Figure 7:
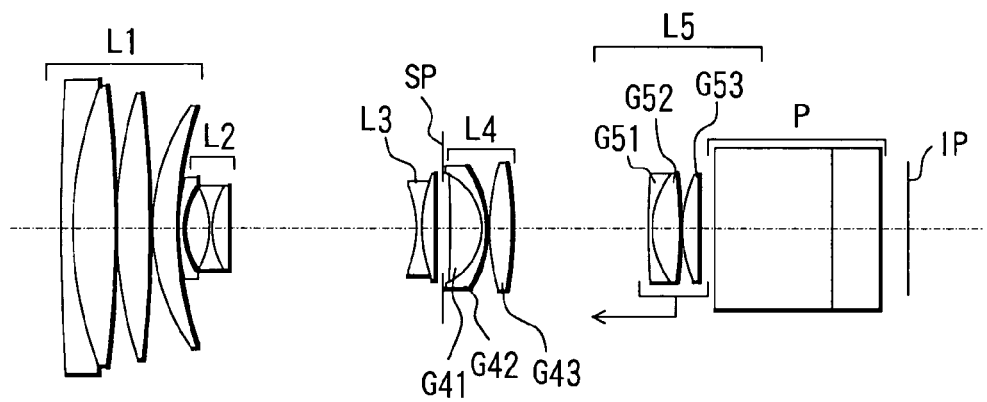
FIG. 7 shows a cross-sectional view of a zoom lens according to Embodiment 2 (Numerical Example 2) of the present invention at a wide-angle end.
Figure 8:
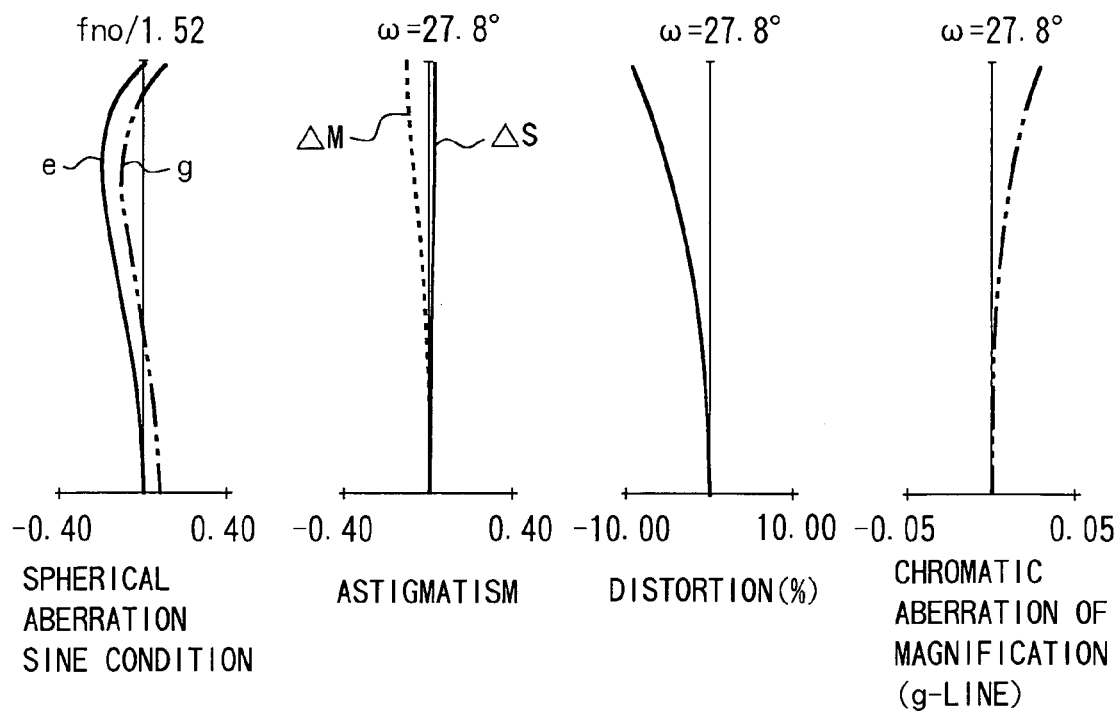
FIG. 8 shows aberration diagrams of the zoom lens according to Numerical Example 2 when f=7.6 mm and an object distance is 2.5 m.
Figure 9:
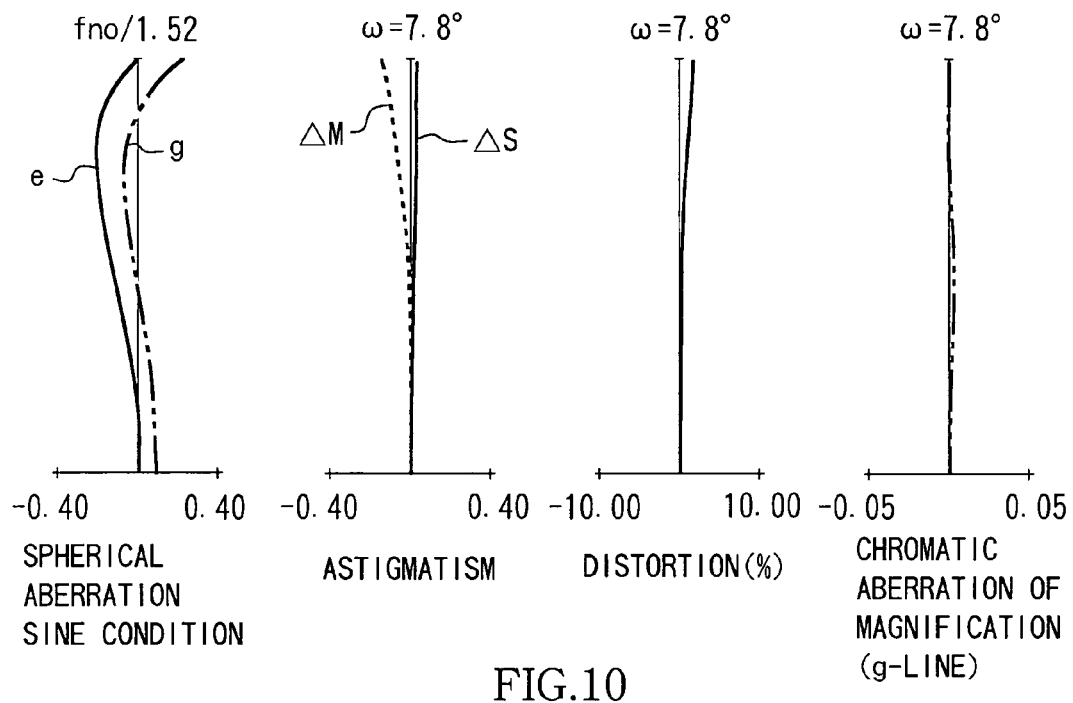
FIG. 9 shows aberration diagrams of the zoom lens according to Numerical Example 2 when f=29.1 mm and an object distance is 2.5 m.
Figure 10:
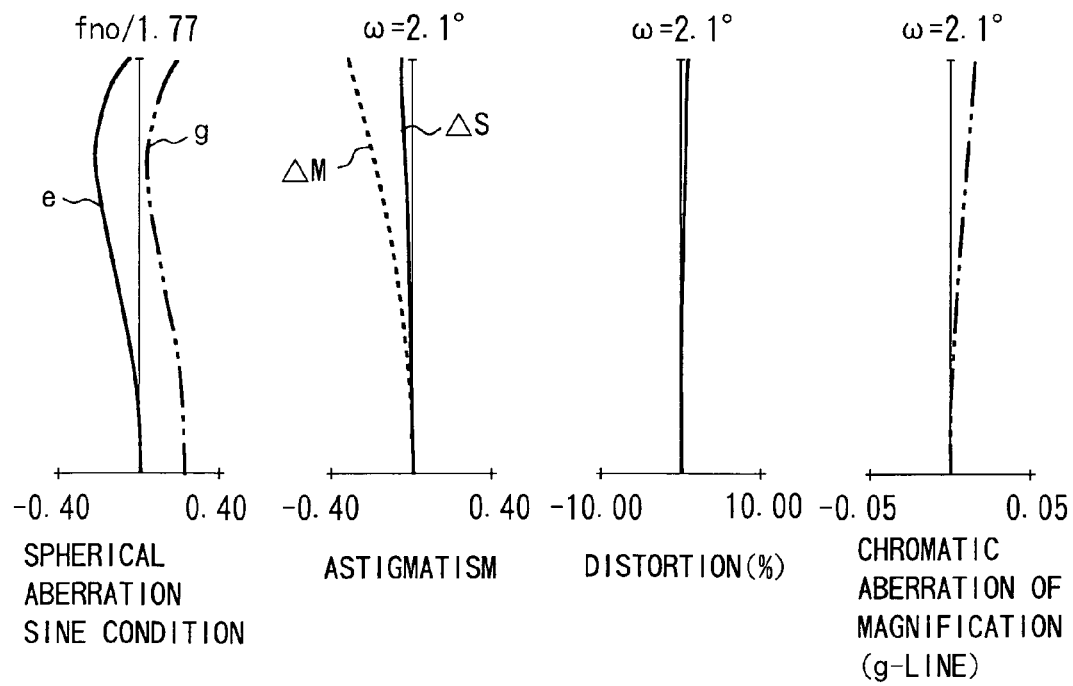
FIG. 10 shows aberration diagrams of the zoom lens according to Numerical Example 2 when f=111.5 mm and the object distance is 2.5 m.
Figure 11:
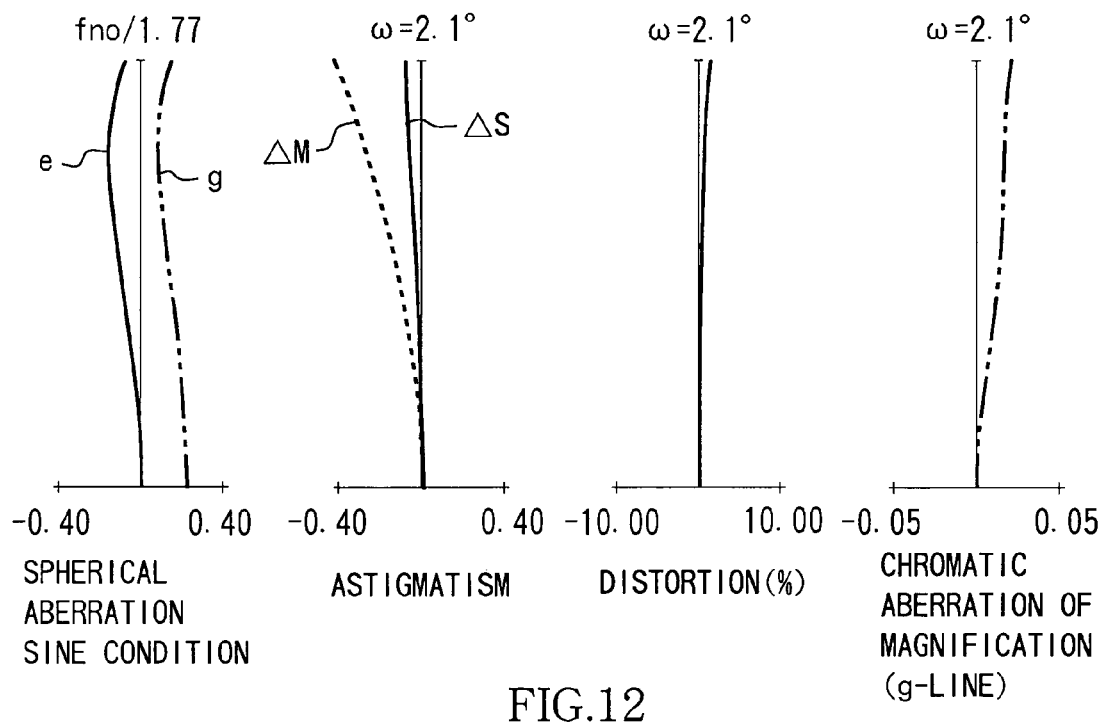
FIG. 11 shows aberration diagrams of the zoom lens according to Numerical Example 2 when f=111.5 mm and the object distance is at infinity.
Figure 12:
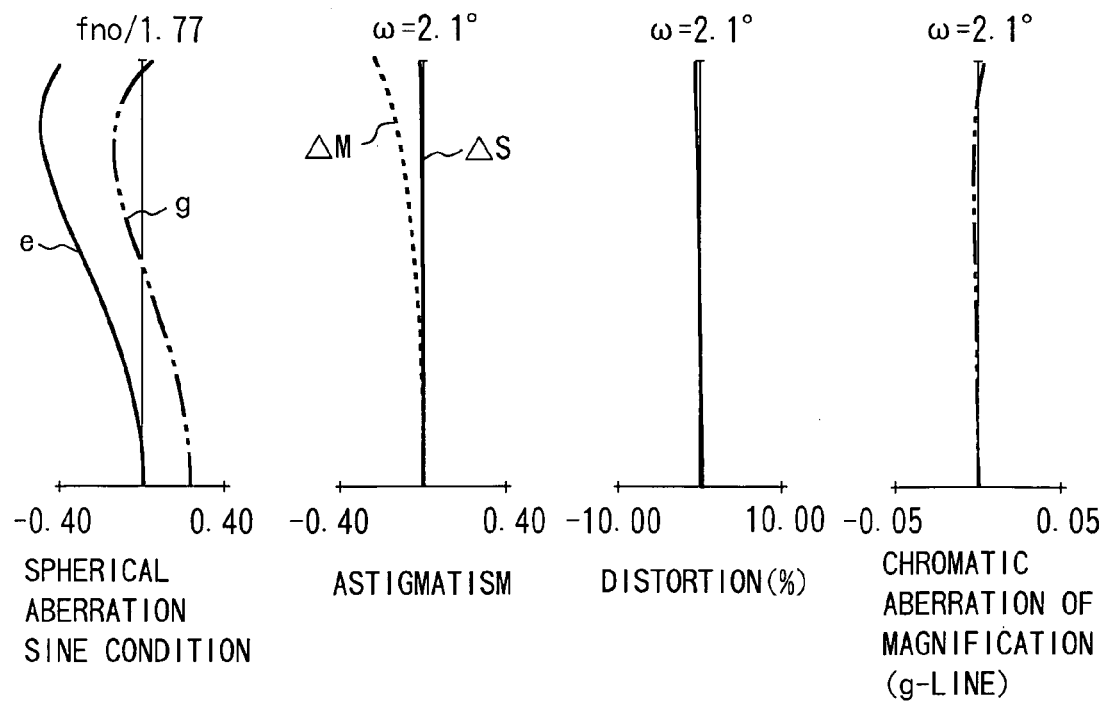
FIG. 12 shows aberration diagrams of the zoom lens according to Numerical Example 2 when f=111.5 mm and the object distance is 0.5 m.

FIG. 7 shows a cross-sectional view of a zoom lens at a wide-angle end according to Embodiment 2 (Numerical Example 2) of the present invention, FIG. 8 shows aberration diagrams of the zoom lens according to Embodiment 2 when f= 7.6 mm and an object distance is 2.5 m, FIG. 9 shows aberration diagrams of the zoom lens according to Embodiment 2 when f=29.1 mm and the object distance is 2.5 m, FIG. 10 shows aberration diagrams of the zoom lens according to Embodiment 2 when f=111.5 mm and the object distance is 2.5 m, FIG. 11 shows aberration diagrams of the zoom lens according to Embodiment 2 when f=111.5 mm and the object distance is at infinity, and FIG. 12 shows aberration diagrams of the zoom lens according to Embodiment 2 when f=111.5 mm and the object distance is 0.5 m.

Figure 13:
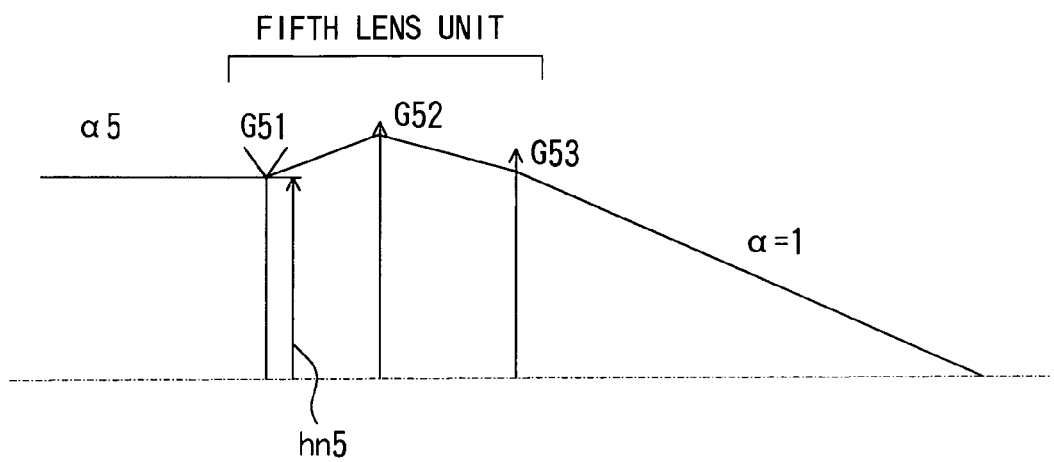
FIG. 13 shows a conceptual diagram of arrangement of the fifth lens unit in the zoom lens according to Embodiments 1 and 2.
Figure 14:
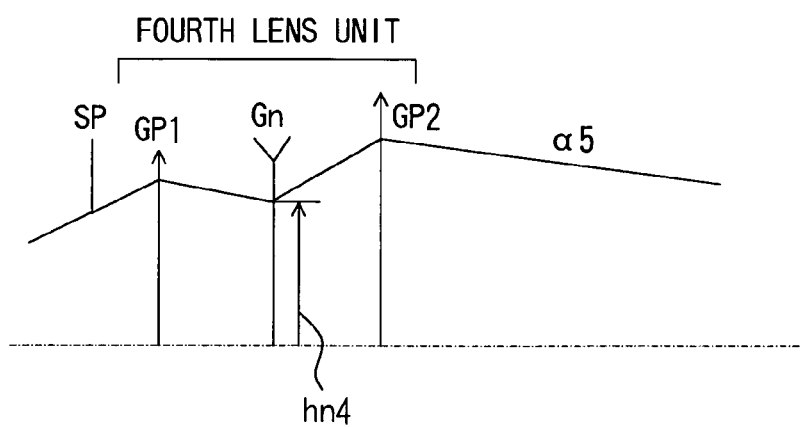
FIG. 14 shows a conceptual diagram of arrangement of the fourth lens unit in the zoom lens according to Embodiments 1 and 2.

In addition, FIG. 13 shows a conceptual diagram of arrangement of a fifth lens unit in the zoom lens according to Embodiments 1 and 2, and FIG. 14 shows a conceptual diagram of arrangement of a fourth lens unit in the zoom lens.

Figure 15:
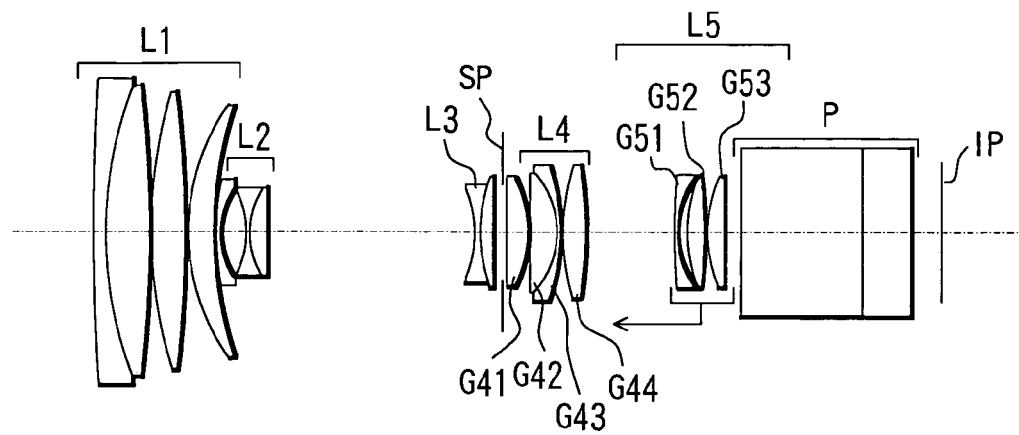
FIG. 15 shows a cross-sectional view of a zoom lens according to Embodiment 3 (Numerical Example 3) of the present invention at a wide-angle end.
Figure 16:
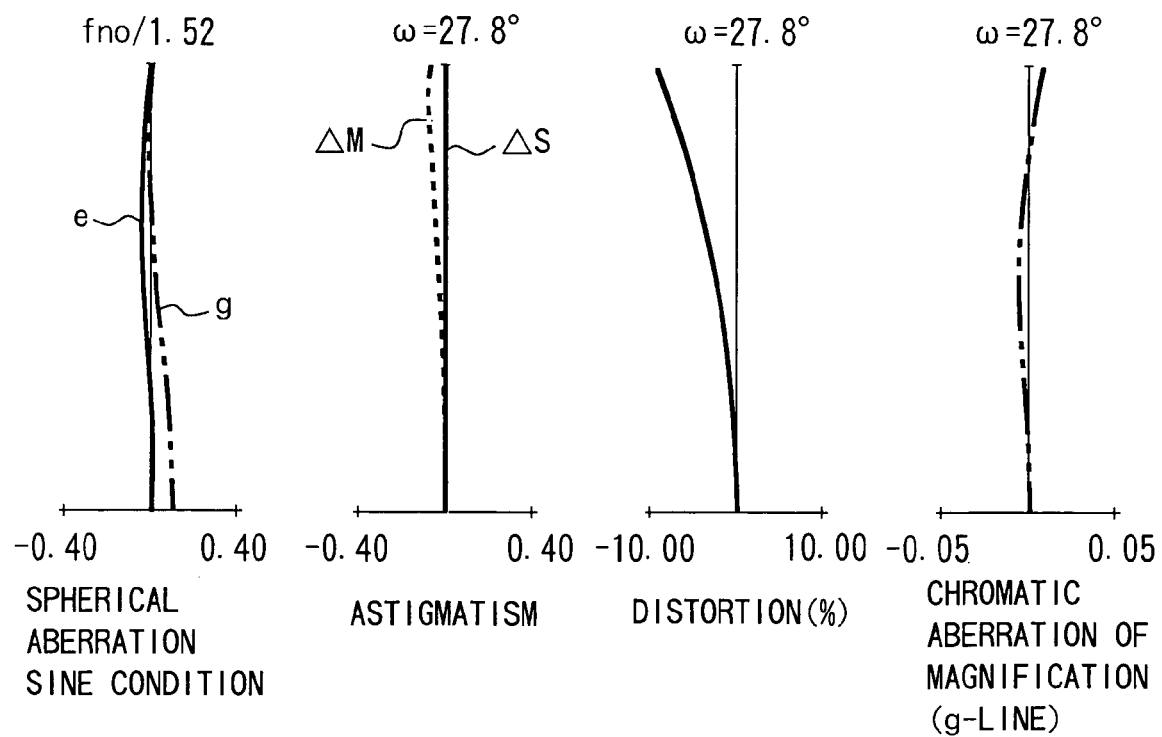
FIG. 16 shows aberration diagrams of the zoom lens according to Numerical Example 3 when f=7.6 mm and an object distance is 2.5 m.
Figure 17:
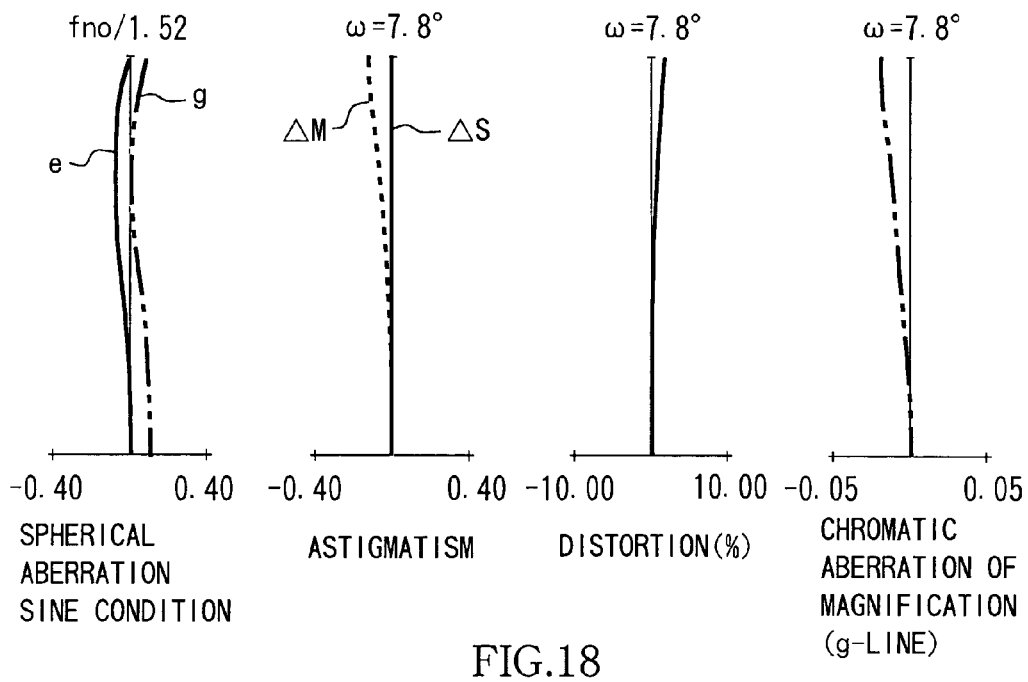
FIG. 17 shows aberration diagrams of the zoom lens according to Numerical Example 3 when f=29.1 mm and the object distance is 2.5 m.
Figure 18:
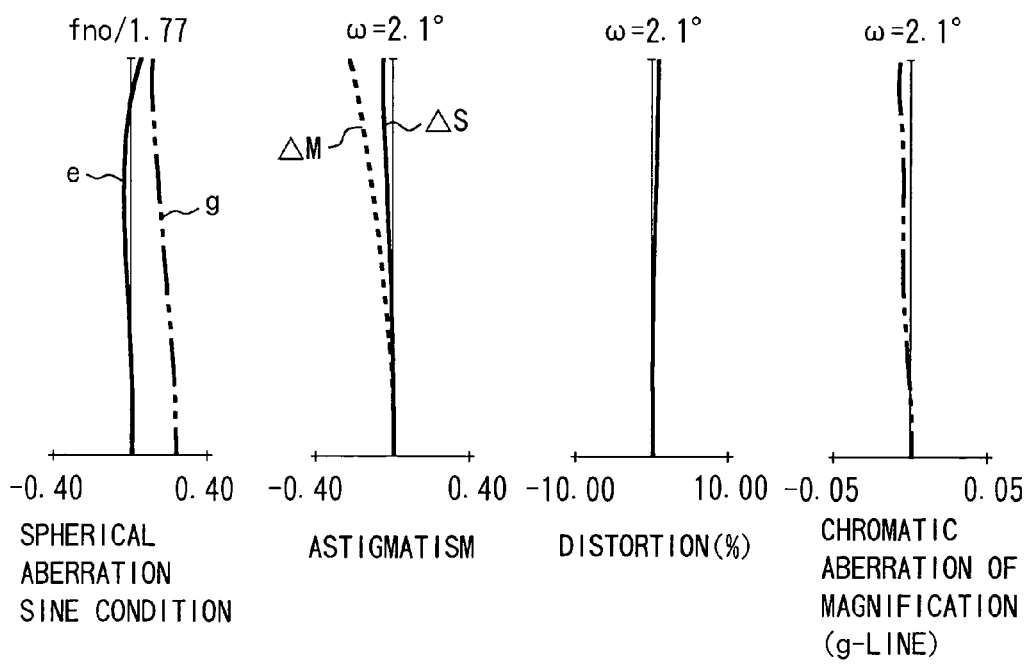
FIG. 18 shows aberration diagrams of the zoom lens according to Numerical Example 3 when f=111.5 mm and the object distance is 2.5 m.

Further, FIG. 15 shows a cross-sectional view of a zoom lens according to Embodiment 3 (Numerical Example 3) of the present invention at a wide-angle end, FIG. 16 shows aberration diagrams of the zoom lens according to Embodiment 3 when f=7.6 mm and an object distance is 2.5 m, FIG. 17 shows aberration diagrams of the zoom lens according to Embodiment 3 when f=29.1 mm and the object distance is 2.5 m, FIG. 18 shows aberration diagrams of the zoom lens according to Embodiment 3 when f=111.5 mm and the object distance is 2.5 m, FIG. 19 shows aberration diagrams of the zoom lens according to Embodiment 3 when f=111.5 mm and the object distance is at infinity, and FIG. 20 shows aberration diagrams of the zoom lens according to Embodiment 3 when f=111.5 mm and the object distance is 0.5 m.

In the following respective embodiments and aberration diagrams, respective numerical values are expressed in units of mm. A reference character f denotes a focal length. Further, an object distance refers to the distance as measured from an image surface.

The zoom lens according to each respective embodiment is an image-taking optical system used for a image-taking system (image-taking apparatus) as will be described, and in the cross-sectional views of a lens system, the left side is an object side (front side) and the right side is an image side (rear side).

In the cross-sectional views of a lens, a reference character L1 denotes a first lens unit having a positive refractive power (optical power=reciprocal of a focal length), a reference character L2 denotes a second lens unit having a negative refractive power, a reference character L3 denotes a third lens unit having a negative refractive power, a reference character L4 denotes a fourth lens unit having a positive refractive power, and a reference character L5 denotes a fifth lens unit having a positive refractive power. A reference character SP denotes an aperture stop and is positioned at the object side of the fourth lens unit L4.

A reference character P denotes an optical element corresponding to an optical filter, a faceplate, a color-separating prism, etc. A reference character IP denotes an image surface. When the zoom lens is used as an image-taking optical system of a video camera or a digital still camera, an image-taking plane of a solid-state image pickup device (photoelectric conversion element) such as a CCD sensor, a CMOS sensor, etc. is disposed on the image surface IP and when the zoom lens is used for a silver-halide film camera, a film plane is disposed on the image surface IP.

In the aberration diagrams, reference characters e and g denote the e line and g line, respectively, reference characters ΔM and ΔS denote a meridional image surface and a sagittal image surface, respectively, and a chromatic aberration of magnification is specified by the g line.

Next, features of the zoom lens according to Embodiments 1 to 3 will be explained.

1. During zooming operation, the second lens unit L2 and the third lens unit L3 are moved, and during focusing operation, the fifth lens unit L5 is moved. The fifth lens unit L5 comprises one negative lens element G51 and two positive lens elements G52 and G53, in order from the object side to the image side. When a focal length of the whole system of the zoom lens at the wide-angle end is normalized to 1, as shown in FIG. 13, let us define an incident reduced tilt angle of an axial marginal ray to the fifth lens unit L5 as being α5, an average value of Abbe's numbers of materials of the positive lens elements G52 and G53 as being ν5p, and an Abbe's number of a material of the negative lens element G51 as being ν5n. Then, the fifth lens unit satisfies the following conditional expressions:

$$0 < \alpha 5 < 0.35 \quad (4)$$

$$1.85 < \nu 5p/\nu 5n \quad (5)$$

Conditional Expressions (4) and (5) are conditions for accomplishing reduction in size and weight of the fifth lens unit L5 and repressing a variation of aberration, by properly establishing a structure of the fifth lens unit L5, a ratio of Abbe's numbers of materials for the lenses, and the incident reduced tilt angle α5 of the axial ray. As shown in FIG. 13, by disposing the negative lens element G51 closest to the object side in the fifth lens unit L5, an incident height hn5 of the axial ray to the negative lens element G51 is increased, so that it is possible to correct for the chromatic aberration in the fifth lens unit L5 with a less refractive power. As a result, the curvature of each lens surface in the fifth lens unit L5 is decreased, so that the generation of aberration in the fifth lens unit L5 can be repressed and the weight of the fifth lens unit can be reduced.

When the negative lens element G51 is disposed closer to the image side, a large refractive power is required for the correction of the chromatic aberration due to decrease in the incident height hn5, so that the curvature of each lens surface is increased and the variation of aberration during focusing operation is increased or the number of lens elements is increased.

Conditional Expression (4) is a condition for repressing the variation of aberration during the focusing operation by simultaneously satisfying the sensitivity of a back focus and reduction in weight of the fifth lens unit L5 and enabling the focusing operation with a small driving power and with a small stroke.

Let us define the incidental conversion field angle of the axial ray to the fifth lens unit L5 as being α5 and the emergent conversion field angle as being α5'. Then, the sensitivity Δsk of the back focus of the fifth lens unit L5 is expressed by the following expression:

$$\Delta sk = \alpha 5'^2 - \alpha 5^2 = 1 - \alpha 5^2 \quad (6)$$

When the refractive power of the fifth lens unit L5 is increased and the lower limit of Conditional Expression (4) is exceeded, the curvatures of the respective lens surfaces constituting the fifth lens unit L5 are increased, so that all aberrations are deteriorated or the variation of aberration during the focusing operation is increased. When the upper limit of Conditional Expression (4) is exceeded, the refractive power of the fifth lens unit L5 is decreased and thus the weight of the whole of the zoom lens can be decreased, but the incident height h5 of the axial ray at the fifth lens unit L5 is largely varied during the focusing operation, so that variations of axial aberrations such as spherical aberration, longitudinal chromatic aberration, etc. are increased.

Conditional Expression (5) is a condition for repressing the refractive powers of the respective lens elements constituting the fifth lens unit L5, repressing variations of off-axial aberration during the focusing operation, and accomplishing reduction in weight of the fifth lens unit L5, by defining the ratio of Abbe's numbers of materials of the positive lens elements G52 and G53 to that of the negative lens element G51 constituting the fifth lens unit L5.

When the lower limit of Conditional Expression (5) is exceeded, |φ5p| and |φ5n| (φ5p and φ5n: optical powers of the positive and negative lens elements of L5, respectively) increase and the curvatures of the respective lens surfaces increase, so that the weight of the fifth lens unit L5 increases. In addition, since the fifth lens unit L5 is apart from the aperture stop SP, the incident height hb5 of an off-axial principal ray is large. As a result, when the curvatures of the respective lens surfaces increase, the off-axial aberrations such as curving of an image surface, astigmatism, etc. during the focusing operation increase.

2. Under an in-focus state for an object at infinity, let us define the focal length of the whole system of the zoom lens at the wide-angle end as being fw (mm), the refractive power of the fifth lens unit L5 as being φ5 when it is normalized to the refractive power φw=1/fw of the zoom lens at the wide-angle end, the emergent reduced tilt angle of the off-axial principal ray of the fifth lens unit L5 as being αb5', and the incident height of the off-axial principal ray of the fifth lens unit L5 as being hb5. Then, the following conditional expression should be satisfied:

$$0(mm) < -\{(hb5-1)/\alpha b5' + hb5/(\alpha b5' - \phi 5 \cdot hb5)\} \cdot fw/30 < 1 \text{ (mm)} \quad (7)$$

Conditional Expression (7) is a condition for defining the refractive power φ5 of the fifth lens unit L5 and the emergent condition of the off-axial principal ray and for repressing variation of the field angle during the focusing operation. Let us define the refractive power of a partial system i as being φi, the incident height of the off-axial principal ray as being hbi, and the incident and emergent conversion angles of the off-axial principal ray as being αbi and αbi', respectively. Then, the variation of the field angle Δy, when the movement amount in the optical axis direction of the partial system i is Δx, can be expressed by the following expressions:

$$\Delta y = \alpha bi' \cdot \phi i \cdot \Delta x \cdot (\Delta x + \delta)$$

$$\delta = -(hbi-1)/\alpha bi' - hbi/(\alpha bi - \phi i \cdot hbi) \quad (8)$$

where δ represents the difference between an apparent distance from the aperture stop to the partial system i and an apparent distance b from the partial system i to the image surface. When Conditional Expression (7) is not satisfied, δ of Expression (8) becomes large and the variation of the field angle of the fifth lens unit L5 during the focusing operation increases, thereby causing some troubles in framing. Further, when the fifth lens unit L5 is used to perform wobbling operation for determination of the in-focus, images vibrate appreciably and periodically at the periphery of a screen, thereby making it difficult to watch the images.

3. The fourth lens unit L4 includes at least two positive lens elements and one negative lens element. Let us define the average values of the Abbe's numbers and the refractive indexes of materials of the two positive lens elements as being ν4p and N4p, respectively, and the Abbe's number and the refractive index of a material of the negative lens elements as being ν4n and N4n, respectively. Then, the following conditional expressions are satisfied:

$$1.0 < v4p/v4n < 1.7 \quad (9)$$

$$0.18 < N4n - N4p \quad (10)$$

Conditional Expressions (9) and (10) define the structure of the fourth lens unit L4 and the Abbe's number ratio and the difference of refractive indices of the materials of the two positive lens elements and the one negative lens element constituting the fourth lens unit L4. That is, in the fourth lens unit L4, the correction of chromatic aberration is made and Petzval's sum is controlled in a positive direction, thereby making off-axial performance better.

When the refractive power of an i-th plane is represented by φRi and the refractive index of the material between the i-th plane and the (i+1)-th plane is represented by Ni (i=surface number), the Petzval's sum P is expressed by the following expression:

$$P = \sum_i \left(\frac{\phi Ri}{Ni}\right) \quad (11)$$

In order to make the size compact and increase the zoom ratio in the zoom lens including four lens units, it is necessary to increase the negative refractive power φ2 of the second lens unit L2. As can be seen from Expression (11), Petzval's sum P tends to increase in the negative direction and this tendency becomes remarkable with decreasing in size or increasing in zoom ratio. Therefore, in order to improve image surface curvature or astigmatism in the whole zoom range, it is important that positive contributions of the fourth lens unit L4 and the fifth lens unit L5 having positive refractive powers to Petzval's sum must be increased.

However, in the present embodiments, since the refractive powers of the lens elements constituting the fifth lens unit L5 are repressed, it is difficult to obtain a large contribution to Petzval's sum from the fifth lens unit L5. Therefore, in the present embodiments, specifically, the refractive index difference and the Abbe's number ratio of the materials of the lens elements constituting the fourth lens unit L4 are properly set and the contribution value P4 of Petzval's sum of the fourth lens unit L4 is set to be positive and large. As a result, peripheral performances are made better in the whole zoom range.

When the lower limit of Conditional Expression (9) is exceeded, it is advantageous for controlling Petzval's sum P4 in the positive direction, but the refractive power of the respective lenses becomes too large, thereby increasing all aberrations. When the upper limit of Conditional Expression (9) is exceeded, it is difficult to control Petzval's sum P4 in the positive direction. In addition, when the lower limit of Conditional Expression (10) is exceeded, the refractive index difference of the materials of the negative lens elements and the positive lens elements decreases, so that it is difficult to control Petzval's sum P4 in the positive direction.

4. The fourth lens unit L4 comprises one or more positive lens elements, one negative lens element, and one positive lens element, in order from the object side to the image side.

In the present embodiments, the arrangement of the positive lens elements and the negative lens elements of the fourth lens unit L4 are defined, thereby making it easy to control the distribution value P4 of Petzval's sum of the fourth lens unit L4 in the positive direction. As shown in FIG. 14, by disposing the negative lens element Gn of the fourth lens unit L4 closer to the object side, the incident height hn of the axial ray to the negative lens element Gn is reduced. As a result, the refractive power required for correcting for the longitudinal chromatic aberration increases, so that it is easy to control Petzval's sum in the positive direction under the condition that the refractive index of the material of the negative lens element Gn is higher than the refractive index of the materials of the positive lens elements GP1 and GP2.

However, since the light flux from the third lens unit L3 is incident by forming a divergent ray, the arrangement of the negative lens element Gn closest to the object side in the fourth lens unit L4 causes increase in size of the fourth lens unit L4 or increases all aberrations, so that it is not preferable.

Therefore, the negative lens element Gn is disposed between the positive lens elements GP1 and GP2. In addition, by increasing the number of the lens elements constituting the fourth lens unit L4, it is possible to correct for all aberrations better.

5. When the refractive power of the fourth lens unit L4, $\phi 4$, is normalized to the refractive power $\phi w$ (1/mm) of the whole system of the zoom lens at the wide-angle end, the fourth lens unit L4 satisfies the following conditional expression:

$$0.023(1/mm) < \phi 4/fw \qquad (12)$$

Conditional Expression (12) indicates a condition for constructing the whole system of the zoom lens with compactness and with a small number of lenses by properly setting the refractive power $\phi 4$ of the fourth lens unit L4. When the lower limit of Conditional Expression (12) is exceeded, the refractive power of the fourth lens unit L4 is reduced, so that it is difficult to converge the diverging light flux from the third lens unit L3. Therefore, in order to converge the light flux, it is necessary to dispose a new positive lens unit at the object side in the fourth lens unit L4, thereby increasing the number of constituent lens elements. On the other hand, in order to alleviate the divergence of the light flux from the third lens unit L3, it is necessary to reduce the refractive power of the third lens unit L3 and thus the movement amount of the third lens unit L3 increases, thereby increasing the total length of the zoom lens.

6. During auto focusing operation, the fifth lens unit L5 is moved in the optical axis direction and during manual focusing operation, the first lens unit L1 is moved in the optical axis direction.

In the present embodiments, operability of the manual focusing is improved by moving the first lens unit L1 during the manual focusing operation. In the optical system having a focal length f, let us define the image-forming point as being i0 when the object distance is at infinity and the image-forming point as being i(obj) when the object distance is obj. Then, the variation amount of image-forming point $\Delta sk = i(obj) - i0$ is expressed from Newton's formula by the following expression:

$$\Delta sk = f^2/(obj-f) \qquad (13)$$

Therefore, when the focusing operation is performed for the partial system B1 closer to the object side than the zoom variator unit, the variation amount $\Delta skB1$ of the image-forming point at the object distance of obj is expressed by the following expression:

$$\Delta skB1 = fB1^2/(obj-fB1) \qquad (14)$$

and it is constant regardless of the zooming.

Therefore, the feed amount $\Delta xFF$ of the focusing partial system FF of the partial system B1 is not varied regardless of the zooming condition.

However, at the image side of the zoom lens unit, the displacement $\Delta skB1$ of the image-forming point in the partial system B1 is magnified or demagnified by the zoom partial system B2 and is approximately expressed by the following expression:

$$\Delta skB2 = \{fB1^2/(obj-fB1)\} \cdot \beta B2^2 \qquad (15)$$

Therefore, when the focusing operation is performed by the focusing partial system FR of the partial system B3 closer to the image side than the zoom lens unit, the movement amount $\Delta xFR$ increases proportionally to the square of the image-forming magnification $\beta B2$ of the zoom lens unit.

Therefore, when the first lens unit L1 is used for the focusing operation, the movement amount due to the zooming is not varied, so that an electrical driving mechanism is not necessary. In addition, it is possible to easily realize a focusing mechanism having excellent operability and follow-up property in the manual operation.

Next, specific structures of the respective embodiments will be described.

Embodiment 1

FIG. 1 shows a cross-sectional view of the zoom lens at the wide-angle end according to Numerical Example 1 of the present invention.

In FIG. 1, a reference character L1 denotes a front lens unit having a positive refractive power as a first lens unit. A reference character L2 denotes a variator lens unit having a negative refractive power for zooming operation as a second lens unit and performs zooming from the wide-angle end to the telephoto end with monotonous movement to the image surface side on the optical axis. A reference character L3 denotes a compensator lens unit having a negative refractive power as a third lens unit and is nonlinearly moved on the optical axis along a convex track toward the object side so as to correct for the variation of image surface due to the zooming. The variator lens unit L2 and the compensator lens unit L3 constitute a zoom system.

A reference character SP denotes an aperture stop and a reference character L4 denotes a relay lens unit having a positive refractive power as a fourth lens unit and being fixed (not moved) during the zooming. A reference character L5 denotes a focus lens unit having a positive refractive power as a fifth lens unit.

Next, features of the fifth lens unit L5 according to Numerical Example 1 will be explained. The fifth lens unit L5 is a rear focus lens unit having a positive refractive power as a whole, and is moved on the optical axis toward the object side when achieving the in-focus in response to a close range object. In the present numerical example, when the close range distance is 0.5 m, the movement amount of the fifth lens unit L5 is -13.24 mm with the sign of the movement amount toward the image side set to be the positive direction, and the movement amount $\Delta x$ of the fifth lens unit is -1.742 in the case where it is normalized to the refractive power $\phi w$ at the wide-angle end.

The fifth lens unit L5 comprises three lens elements G51, G52, and G53 having negative, positive, and positive refractive powers, respectively, in order from the object side to the image side. By disposing the negative lens element G51 among these lenses closest to the object side, the incident height of the axial ray at the negative lens element G51 is increased, so that it is possible to correct for the chromatic aberration with a less refractive power. As a result, it is possible to repress generation of all aberrations and to accomplish weight reduction in the fifth lens unit L5.

Table 1 shows paraxial tracking values when the focal length at the wide-angle end is normalized to 1 in Numerical Example 1. From Table 1, since the incident reduced tilt angle α5 of the fifth lens unit L5 is 0.29, Conditional Expression (4) is satisfied. The sensitivity Δsk of the back focus of the fifth lens unit L5 is expressed by the following expression:

$$\Delta sk = 1 - \alpha 5^2 = 0.916 \quad (16)$$

Thus, by ensuring the sensitivity of the back focus of the fifth lens unit L5, it is possible to perform the focusing operation with a small stroke.

Since the Abbe's number ν5n of the material of the negative lens element G51 of the fifth lens unit L5 is 30.1 and also the average value ν5p of the Abbe's numbers of the materials of the positive lens elements G52 and G53 is 64.1, the ratio ν5p/ν5n is given by $$\nu 5p/\nu 5n = 2.13 \quad (17)$$

Thus, Conditional Expression (5) is satisfied, and by repressing the refractive powers of the respective lens elements constituting the fifth lens unit L5, it is possible to repress the variation of off-axial aberrations during the focusing operation and to accomplish reduction in weight.

According to Table 1, the refractive power φ5 of the fifth lens unit L5 is 0.149445, the incident height hb5 of the off-axial principal ray is 0.859734, and the emergent reduced tilt angle αb5' is −0.158024. Therefore, the middle term of Conditional Expression (7) is calculated to be 0.175 and thus Conditional Expression (7) is satisfied, thereby repressing the variation of the field angle due to the focusing operation.

Next, features of the fourth lens unit L4 according to Numerical Example 1 will be explained. The fourth lens unit L4 is a fixed lens unit having a positive refractive power as a whole. The fourth lens unit L4 of the present embodiment comprises three lens elements G41, G42, and G43 having positive, negative, and positive refractive powers, respectively, in order from the object side to the image side. By disposing the negative lens element G42 closer to the object side than the positive lens element G43, it is easy to control Petzval's sum of the fourth lens unit L4 in the positive direction.

The refractive index Nn of the material of the negative lens element G42 of the fourth lens unit L4 is 1.81078, the Abbe's number ν4n thereof is 40.9, the average value Np of the refractive indexes of the materials of the positive lens elements G41 and G43 is 1.60548, and the average value ν4p of the Abbe's numbers thereof is 60.6. Accordingly, the values of expressions of Conditional Expressions (9) and (10) are given by the following:

$$\nu 4p/\nu 4n = 1.48 \quad (18)$$

$$N4n - N4p = 0.205 \quad (19)$$

Therefore, Conditional Expressions (9) and (10) are satisfied, and by increasing Petzval's sum of the fourth lens unit L4 in the positive direction, the image surface curvature and astigmatism are repressed over the whole zoom range, thereby improving peripheral performances.

According to Table 1, the refractive power φ4 of the fourth lens unit L4 is 0.252140. With fw=7.6 (mm) the value of an expression of Conditional Expression (12) is given by the following:

$$\phi 4/fw = 0.0333(1/mm) \quad (20)$$

Therefore, Conditional Expression (12) is satisfied, thereby accomplishing compactness of the whole system of the zoom lens.

In the present embodiment, it is also possible to move the first lens unit L1 as the focus lens unit on the optical axis. When the first lens unit L1 is used for the manual focusing operation, the variation of movement amount due to the zooming does not occur, so that an electrical driving mechanism is not necessary and it is thus possible to realize a focusing mechanism with excellent operability and follow-up property during the manual focusing operation.

TABLE 1

| LENS UNIT | φ | h—h | α | h | α b | h b |
|---|---|---|---|---|---|---|
| 1 | +0.099234 | 1.322026 | +0.000000 | +1.000000 | −1.000000 | −3.893097 |
| 2 | −0.551221 | 7.737920 | +0.099234 | +0.868810 | −1.386326 | −2.060337 |
| 3 | −0.210727 | 1.719668 | −0.379673 | +3.806691 | −0.250625 | −0.121024 |
| 4 | +0.252140 | 3.756525 | −1.181847 | +5.839076 | −0.225122 | +0.266111 |
| 5 | +0.149445 | 4.748113 | +0.290418 | +4.748112 | −0.158024 | +0.859734 |
| IMAGE SURFACE | | | +1.000000 | +0.000000 | −0.029542 | +1.000000 |

Embodiment 2

FIG. 7 shows a cross-sectional view of the zoom lens at the wide-angle end according to Numerical Example 2 of the present invention.

In FIG. 7, a reference character L1 denotes a front lens unit having a positive refractive power as a first lens unit. A reference character L2 denotes a variator lens unit having a negative refractive power for zooming operation as a second lens unit and performs the zooming from the wide-angle end to the telephoto end with monotonous movement on the image surface side on the optical axis.

A reference character L3 denotes a compensator lens unit having a negative refractive power as a third lens unit and is nonlinearly moved on the optical axis along a convex track toward the object side so as to correct for the variation of image surface due to the zooming. The variator lens unit L2 and the compensator lens unit L3 constitute a zoom system.

A reference character SP denotes an aperture stop, and a reference character L4 denotes a relay lens unit having a positive refractive power as a fourth lens unit and being fixed (not moved) during the zooming operation. A reference character L5 denotes a focus lens unit having a positive refractive power as a fifth lens unit.

Next, features of the fifth lens unit L5 according to Numerical Example 2 will be explained. The fifth lens unit L5 is a rear focus lens unit having a positive refractive power as a whole, and is moved on the optical axis toward the object side when achieving the in-focus in response to a close range object. In the present embodiment, when the close range distance is 0.5 m, the movement amount of the fifth lens unit L5 is −12.55 mm with the sign of the movement amount toward the image side set to be the positive direction. The movement amount Δx of the fifth lens unit L5 is −1.651 when it is normalized to the refractive power ϕw at the wide-angle end.

The fifth lens unit L5 comprises three lens elements G51, G52, and G53 having negative, positive, and positive refractive powers, respectively, in order from the object side to the image side. By disposing the negative lens element G51 among these lenses closest to the object side, the incident height of the axial ray at the negative lens element G51 is increased, so that it is possible to correct for the chromatic aberration with a less refractive power. As a result, it is possible to repress generation of all aberrations and to accomplish weight reduction in the fifth lens unit L5.

Table 2 shows paraxial tracking values when normalized to the refractive power ϕw at the wide-angle end in Numerical Example 2. From Table 2, since the incident reduced tilt angle α5 of the fifth lens unit L5 is 0.004, Conditional Expression (4) is satisfied. The sensitivity Δsk of the back focus of the fifth lens unit L5 is expressed by the following expression:

$$\Delta sk = 1 - \alpha 5^2 = 1.000 \quad (21)$$

Thus, by ensuring the sensitivity of the back focus of the fifth lens unit L5, it is possible to perform the focusing operation with a small stroke.

Since the Abbe's number ν5n of the material of the negative lens element G51 of the fifth lens unit L5 is 25.4 and also the average value ν5p of the Abbe's numbers of the materials of the positive lens elements G52 and G53 is 50.9, the ratio ν5p/ν5n is given by $$\nu 5p/\nu 5n = 2.00 \quad (22)$$

Thus, by repressing the refractive powers of the respective lens elements constituting the fifth lens unit L5, it is possible to repress the variation of off-axial aberrations due to the focusing operation and to accomplish reduction in weight.

According to Table 2, the refractive power ϕ5 of the fifth lens unit L5 is 0.170427, the incident height hb5 of the off-axial principal ray is 1.282568, and the emergent reduced tilt angle αb5' is 0.04833. Therefore, the middle term of Conditional Expression (7) is calculated to be 0.418 and thus Conditional Expression (7) is satisfied, thereby repressing the variation of the field angle due to the focusing operation.

Next, features of the fourth lens unit L4 according to Numerical Example 2 will be explained. The fourth lens unit L4 is a fixed lens unit having a positive refractive power as a whole. The fourth lens unit L4 of the present embodiment comprises three lens elements G41, G42, and G43 having positive, negative, and positive refractive powers, respectively, in order from the object side to the image side. By disposing the negative lens element G42 closer to the object side than the positive lens element G43, it is easy to control Petzval's sum of the fourth lens unit L4 in the positive direction.

The refractive index Nn of the material of the negative lens element G42 of the fourth lens unit L4 is 1.82017, the Abbe's number ν4n thereof is 46.6, the average value Np of the refractive indexes of the materials of the positive lens elements G41 and G43 is 1.61671, and the average value ν4p of the Abbe's numbers thereof is 54.1. Accordingly, the values of expressions of Conditional Expressions (9) and (10) are given by the following:

$$\nu 4p/\nu 4n = 1.16 \quad (23)$$

$$N4n - N4p = 0.203 \quad (24)$$

Therefore, Conditional Expressions (9) and (10) are satisfied, and by increasing Petzval's sum of the fourth lens unit L4 in the positive direction, the image surface curvature and astigmatism are repressed over the whole zoom range, thereby improving peripheral performances.

According to Table 2, the refractive power ϕ4 of the fourth lens unit L4 is 0.202056. With fw=7.6 (mm) the value of an expression of Conditional Expression (12) is given by the following:

$$\phi 4/fw = 0.0266 (1/mm) \quad (25)$$

Therefore, Conditional Expression (12) is satisfied, thereby accomplishing compactness of the whole system of the zoom lens.

In the present embodiment, it is also possible to move the first lens unit L1 as the focus lens unit on the optical axis. When the first lens unit L1 is used for the manual focusing operation, the variation of movement amount due to the zooming does not occur, so that an electrical driving mechanism is not necessary and it is thus possible to realize a focusing mechanism with excellent operability and follow-up property during the manual focusing operation.

TABLE 2

| LENS UNIT | ϕ | h—h | α | h | α b | h b |
|---|---|---|---|---|---|---|
| 1 | +0.099246 | 1.322026 | +0.000000 | +1.000000 | −1.000000 | −3.893097 |
| 2 | −0.551221 | 7.737920 | +0.099246 | +0.868810 | −1.386326 | −2.060080 |
| 3 | −0.210727 | 1.743825 | −0.379720 | +3.806691 | −0.250625 | −0.121009 |
| 4 | +0.202056 | 5.938328 | −1.181995 | +5.867882 | −0.225122 | +0.271564 |
| 5 | +0.170427 | 5.846243 | +0.003644 | +5.846242 | −0.170251 | +1.282568 |
| IMAGE SURFACE | | | +1.000000 | +0.000000 | +0.048333 | +1.000000 |

Embodiment 3

FIG. 15 shows a cross-sectional view of the zoom lens according to Numerical Example 3 of the present invention at the wide-angle end.

In FIG. 15, a reference character L1 denotes a front lens unit having a positive refractive power as a first lens unit. A reference character L2 denotes a variator lens unit having a negative refractive power for zooming operation as a second lens unit and performs the zooming from the wide-angle end to the telephoto end with monotonous movement on the image surface side on the optical axis. A reference character L3 denotes a compensator lens unit having a negative refractive power as a third lens unit and is nonlinearly moved on the optical axis along a convex track toward the object side so as to correct for the variation of image surface due to the zooming. The variator lens unit L2 and the compensator lens unit L3 constitute a zoom system.

A reference character SP denotes an aperture stop, and a reference character L4 denotes a relay lens unit having a positive refractive power as a fourth lens unit and being fixed (not moved) during the zooming. A reference character L5 denotes a focus lens unit having a positive refractive power as a fifth lens unit.

Next, features of the fifth lens unit L5 according to Numerical Example 3 will be explained. The fifth lens unit L5 is a rear focus lens unit having a positive refractive power as a whole and is moved on the optical axis toward the object side when achieving the in-focus in response to a close range object. In the present embodiment, when the close range distance is 0.5 m, the movement amount of the fifth lens unit L5 is −12.48 mm with the sign of the movement amount toward the image side set to be the positive direction. The movement amount $\Delta x$ of the fifth lens unit L5 is −1.642 when it is normalized to the refractive power $\phi w$ at the wide-angle end.

The fifth lens unit L5 comprises three lens elements G51, G52, and G53 having negative, positive, and positive refractive powers, respectively, in order from the object side to the image side. By disposing the negative lens element G51 among these lenses closest to the object side, the incident height of the axial ray at the negative lens element G51 is increased, so that it is possible to correct for the chromatic aberration with a less refractive power. As a result, it is possible to repress generation of all aberrations in the fifth lens unit L5 and to accomplish reduction in weight thereof.

Table 3 shows paraxial tracking values when the focal length at the wide-angle end is normalized to 1 in Numerical Example 3. From Table 3, since the incident reduced tilt angle $\alpha 5$ of the fifth lens unit L5 is 0.158, Conditional Expression (4) is satisfied. The sensitivity $\Delta sk$ of the back focus of the fifth lens unit L5 is expressed by the following expression:

$$\Delta sk = 1 - \alpha 5^2 = 0.975 \tag{26}$$

Thus, by ensuring the sensitivity of the back focus of the fifth lens unit L5, it is possible to perform the focusing operation with a small stroke.

Since the Abbe's number of the material of the negative lens element G51 of the fifth lens unit L5 is 23.8 and also the average value of the Abbe's numbers of the materials of the positive lens elements G52 and G53 is 70.2, the ratio $\nu 5p/\nu 5n$ is given by $$\nu 5p/\nu 5n = 2.950 \tag{27}$$

Thus, Conditional Expression (5) is satisfied, and by repressing the refractive powers of the respective lens elements constituting the fifth lens unit L5, it is possible to repress the variation of off-axial aberrations due to the focusing operation and to accomplish reduction in weight.

According to Table 3, the refractive power $\phi 5$ of the fifth lens unit L5 is 0.170381, the incident height hb5 of the off-axial principal ray is 1.068205, and the emergent reduced tilt angle $\alpha b5'$ is 0.013804. Therefore, the middle term of Conditional Expression (7) is calculated to be 0.356 and thus Conditional Expression (7) is satisfied, thereby repressing the variation of the field angle due to the focusing operation.

Next, features of the fourth lens unit L4 according to Numerical Example 3 will be explained. The fourth lens unit L4 is a fixed lens unit having a positive refractive power as a whole. The fourth lens unit L4 of the present embodiment comprises four lens elements G41, G42, G43, and G44 having positive, positive, negative, and positive refractive powers, respectively, in order from the object side to the image side. By disposing two positive lens elements G41 and G42 among these lenses closest to the object side, it is easier to correct for spherical aberration, longitudinal chromatic aberration, coma aberration, etc.

The refractive index Nn of the material of the negative lens element G43 of the fourth lens unit L4 is 1.83945, the Abbe's number $\nu 4n$ thereof is 42.7, the average value Np of the refractive indexes of the materials of the positive lens elements G41, G42, and G44 is 1.55432, and the average value $\nu 4p$ of the Abbe's numbers thereof is 57.2. Accordingly, the values of expressions of Conditional Expressions (9) and (10) are given by the following:

$$\nu 4p/\nu 4n = 1.340 \tag{28}$$

$$N4n - N4p = 0.285 \tag{29}$$

Therefore, Conditional Expressions (9) and (10) are satisfied, and by increasing Petzval's sum of the fourth lens unit L4 in the positive direction, the image surface curvature and astigmatism are repressed over the whole zoom range, thereby improving peripheral performances.

According to Table 3, the refractive power $\phi 4$ of the fourth lens unit L4 is 0.234409. With fw=7.6 (mm), the value of an expression of Conditional Expression (12) is given by the following:

$$\phi 4/fw = 0.031 (1/mm) \tag{30}$$

Therefore, Conditional Expression (12) is satisfied, thereby accomplishing compactness of the whole system of the zoom lens.

In the present embodiment, it is also possible to move the first lens unit L1 as the focus lens unit on the optical axis. When the first lens unit L1 is used for the manual focusing operation, the variation of movement amount due to the zooming does not occur, so that an electrical driving mechanism is not necessary and it is thus possible to realize a focusing mechanism with excellent operability and follow-up property during the manual focusing operation.

TABLE 3

| LENS UNIT | $\phi$ | h—h | $\alpha$ | h | $\alpha b$ | h b |
|---|---|---|---|---|---|---|
| 1 | +0.099246 | 1.321866 | +0.000000 | +1.000000 | −1.000000 | −3.892626 |
| 2 | −0.551288 | 7.736982 | +0.099246 | +0.868810 | −1.386326 | −2.060088 |
| 3 | −0.210753 | 1.616235 | −0.379719 | +3.806691 | −0.250625 | −0.121009 |
| 4 | +0.234409 | 4.907107 | −1.181991 | +5.717065 | −0.225122 | +0.242840 |

TABLE 3-continued

| LENS UNIT | φ | h—h | α | h | α b | h b |
|---|---|---|---|---|---|---|
| 5 | +0.170381 | 4.941062 | +0.158138 | +4.941062 | −0.168198 | +1.068205 |
| IMAGE SURFACE | | | +1.000000 | +0.000000 | +0.013804 | +1.000000 |

In the above embodiments, it is more preferable that the numerical values of Conditional Expressions (4), (5), (7), (9), (10), and (12) are set as follows.

$$0 < \alpha 5 < 0.3 \quad (4a)$$

$$1.9 < v5p/v5n \quad (5a)$$

$$0(mm) < -\{(hb5-1)/\alpha b5' + hb5/(\alpha b5' - \phi 5 \cdot hb5)\} \cdot fw/30 < 0.8(mm) \quad (7a)$$

$$1.1 < v4p/v4n < 1.5 \quad (9a)$$

$$0.19 < N4n - N4p \quad (10a)$$

$$0.02(1/mm) < \phi 4/fw \quad (12a)$$

As explained above, according to Embodiments 1 to 3, ear focusing type zoom lens having a lens unit structure of positive, negative, negative, positive, and positive refractive powers in which the second lens unit L2 and the third lens unit L3 are used for zooming and the fifth lens unit L5 is used as the focus lens unit, it is possible to obtain a zoom lens having a high magnification, a compact structure, and an excellent optical performance by properly setting the structures or various constants of the fourth lens unit L4 and the fifth lens unit L5.

That is, according to Embodiments 1 to 3, it is possible to realize a zoom lens exhibiting an excellent optical performance over the whole zoom range from the wide-angle end to the telephoto end and over the whole range of the object distance from an object at infinity to an close range object.

Hereinafter, the detailed structural aspects of Numerical Examples 1 to 3 are given in Tables 4 to 6. In the respective tables, a reference character i denotes the order of a surface from the object side, a reference character ri denotes the radius of curvature of each surface, a reference character di denotes the thickness of medium or the air gap between the i-th surface and the (i+1)-th surface, and reference characters ni and vi denote the refractive index and the Abbe's number of the e line, respectively. Further, in Numerical Examples 1 to 3, three surfaces closest to the image side are planes corresponding to a glass block. A reference character f denotes a focal length, a reference character fno denotes an F number, and a reference character ω denotes a half field angle. In addition, Table 7 gives various numerical values of Numerical Examples corresponding to Conditional Expressions (4), (5), (7), (9), (10), and (12) described above.

TABLE 4 f = 7.59894 fno = 1:1.52~1.77 2ω = 55.5°~4.1°

| r1 = 1169.481 | d1 = 2.40 | n1 = 1.81265 | v1 = 25.4 |
| r2 = 98.429 | d2 = 10.83 | n2 = 1.51825 | v2 = 64.2 |
| r3 = −265.170 | d3 = 0.20 | | |
| r4 = 124.037 | d4 = 8.29 | n3 = 1.60548 | v3 = 60.7 |
| r5 = −281.395 | d5 = 0.20 | | |
| r6 = 51.797 | d6 = 6.46 | n4 = 1.64254 | v4 = 60.1 |
| r7 = 97.915 | d7 = VARIABLE | | |
| r8 = 71.045 | d8 = 0.90 | n5 = 1.82017 | v5 = 46.6 |
| r9 = 17.601 | d9 = 6.01 | | |

TABLE 4-continued

| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = 4295.134 | d12 = VARIABLE | | |
| r13 = −27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = VARIABLE | | |
| r16 = APERTURE STOP | d16 = 1.60 | | |
| r17 = 290.640 | d17 = 8.32 | n10 = 1.60548 | v10 = 60.6 |
| r18 = −14.781 | d18 = 1.20 | n11 = 1.81078 | v11 = 40.9 |
| r19 = −26.866 | d19 = 0.20 | | |
| r20 = 53.725 | d20 = 6.21 | n12 = 1.60548 | v12 = 60.6 |
| r21 = −79.373 | d21 = VARIABLE | | |
| r22 = 119.096 | d22 = 1.20 | n13 = 1.70442 | v13 = 30.1 |
| r23 = 21.431 | d23 = 7.24 | n14 = 1.51825 | v14 = 64.1 |
| r24 = −89.924 | d24 = 0.20 | | |
| r25 = 31.351 | d25 = 4.46 | n15 = 1.51825 | v15 = 64.1 |
| r26 = 6222.983 | d26 = VARIABLE | | |
| r27 = ∞ | d27 = 29.00 | n16 = 1.60718 | v16 = 38.0 |
| r28 = ∞ | d28 = 11.20 | n17 = 1.51825 | v17 = 64.2 |
| r29 = ∞ | | | |

| FOCAL LENGTH VARIABLE DISTANCE | 7.60 | 29.10 | 111.48 |
|---|---|---|---|
| d 7 | 0.39 | 33.92 | 49.55 |
| d 12 | 52.91 | 14.80 | 3.78 |
| d 15 | 1.55 | 6.13 | 1.53 |
| d 21 | 20.00 | 20.00 | 20.00 |
| d 27 | 3.80 | 3.80 | 3.80 |

TABLE 5 f = 7.59989 fno = 1:1.52~1.77 2ω = 55.5°~4.1°

| r1 = 1169.481 | d1 = 2.40 | n1 = 1.81265 | v1 = 25.4 |
| r2 = 98.429 | d2 = 10.83 | n2 = 1.51825 | v2 = 64.2 |
| r3 = 265.170 | d3 = 0.20 | | |
| r4 = 124.037 | d4 = 8.29 | n3 = 1.60548 | v3 = 60.7 |
| r5 = −281.395 | d5 = 0.20 | | |
| r6 = 51.797 | d6 = 6.46 | n4 = 1.64254 | v4 = 60.1 |
| r7 = 97.915 | d7 = VARIABLE | | |
| r8 = 71.045 | d8 = 0.90 | n5 = 1.82017 | v5 = 46.6 |
| r9 = 17.601 | d9 = 6.01 | | |
| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = −4295.134 | d12 = VARIABLE | | |
| r13 = 27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = VARIABLE | | |
| r16 = APERTURE STOP | d16 = 1.60 | | |
| r17 = 10000.000 | d17 = 8.10 | n10 = 1.61671 | v10 = 55.0 |
| r18 = 15.601 | d18 = 1.20 | n11 = 1.82017 | v11 = 46.6 |
| r19 = −37.306 | d19 = 0.20 | | |
| r20 = 110.820 | d20 = 5.22 | n12 = 1.62508 | v12 = 53.2 |
| r21 = −51.132 | d21 = VARIABLE | | |
| r22 = 786.500 | d22 = 1.20 | n13 = 1.81264 | v13 = 25.4 |
| r23 = 25.913 | d23 = 7.96 | n14 = 1.66152 | v14 = 50.9 |
| r24 = 77.604 | d24 = 0.20 | | |
| r25 = 37.803 | d25 = 5.34 | n15 = 1.66152 | v15 = 50.9 |
| r26 = −1000.000 | d26 = VARIABLE | | |
| r27 = ∞ | d27 = 29.00 | n16 = 1.60718 | v16 = 38.0 |
| r28 = ∞ | d28 = 11.20 | n17 = 1.51825 | v17 = 64.2 |
| r29 = ∞ | | | |

TABLE 5-continued

| FOCAL LENGTH VARIABLE DISTANCE | 7.60 | 29.11 | 111.49 |
|---|---|---|---|
| d 7 | 0.39 | 33.92 | 49.55 |
| d 12 | 52.91 | 14.80 | 3.78 |
| d 15 | 1.55 | 6.13 | 1.53 |
| d 21 | 37.00 | 37.00 | 37.00 |
| d 26 | 3.80 | 3.80 | 3.80 |

TABLE 6 f = 7.59986 fno = 1:1.52~1.77 2ω = 55.5°~4.1°

| r1 = 1169.481 | d1 = 2.40 | n1 = 1.81265 | v1 = 25.4 |
|---|---|---|---|
| r2 = 98.429 | d2 = 10.83 | n2 = 1.51825 | v2 = 64.2 |
| r3 = −265.170 | d3 = 0.20 | | |
| r4 = 124.037 | d4 = 8.29 | n3 = 1.60548 | v3 = 60.7 |
| r5 = −281.395 | d5 = 0.20 | | |
| r6 = 51.797 | d6 = 6.46 | n4 = 1.64254 | v4 = 60.1 |
| r7 = 97.915 | d7 = VARIABLE | | |
| r8 = 71.045 | d8 = 0.90 | n5 = 1.82017 | v5 = 46.6 |
| r9 = 17.601 | d9 = 6.01 | | |
| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = −4295.134 | d12 = VARIABLE | | |
| r13 = −27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = VARIABLE | | |
| r16 = 0.000 (APERTURE STOP) | d16 = 1.60 | | |
| r17 = ∞ | d17 = 4.73 | n10 = 1.62286 | v10 = 60.3 |
| r18 = −30.301 | d18 = 0.20 | | |
| r19 = −314.637 | d19 = 6.99 | n11 = 1.52033 | v11 = 58.9 |
| r20 = −19.154 | d20 = 1.20 | n12 = 1.83945 | v12 = 42.7 |
| r21 = −62.330 | d21 = 0.20 | | |
| r22 = 47.509 | d22 = 5.72 | n13 = 1.51976 | v13 = 52.4 |
| r23 = −83.974 | d23 = VARIABLE | | |
| r24 = 95.840 | d24 = 1.20 | n14 = 1.85504 | v14 = 23.8 |
| r25 = 32.514 | d25 = 2.01 | | |
| r26 = 78.907 | d26 = 4.80 | n15 = 1.48915 | v15 = 70.2 |
| r27 = −46.367 | d27 = 0.20 | | |
| r28 = 28.293 | d28 = 5.65 | n16 = 1.48915 | v16 = 70.2 |
| r29 = −133.007 | d29 = VARIABLE | | |
| r30 = ∞ | d30 = 29.00 | n17 = 1.60718 | v17 = 38.0 |
| r31 = ∞ | d31 = 11.20 | n18 = 1.51825 | v18 = 64.2 |
| r32 = ∞ | | | |

| FOCAL LENGTH VARIABLE DISTANCE | 7.60 | 29.11 | 111.49 |
|---|---|---|---|
| d 7 | 0.39 | 33.92 | 49.55 |
| d 12 | 52.91 | 14.80 | 3.78 |
| d 15 | 1.55 | 6.13 | 1.53 |
| d 23 | 22.00 | 22.00 | 22.00 |
| d 29 | 3.80 | 3.80 | 3.80 |

TABLE 7

| | EMBODIMENT | | |
|---|---|---|---|
| CONDITIONAL EXPRESSION | 1 | 2 | 3 |
| (4) 0 < α5 < 0.35 | 0.29 | 0.004 | 0.158 |
| (5) 1.85 < v5p/v5n | 2.13 | 2.00 | 2.950 |
| (7) | 0.356 | 0.418 | 0.130 |
| (9) 1.0 < v4p/v4n < 1.7 | 1.48 | 1.16 | 1.34 |
| (10) 0.18 < N4n − N4p | 0.205 | 0.203 | 0.285 |
| (12) 0.023 < φ4/fw | 0.033 | 0.0266 | 0.031 |

Figure 21:
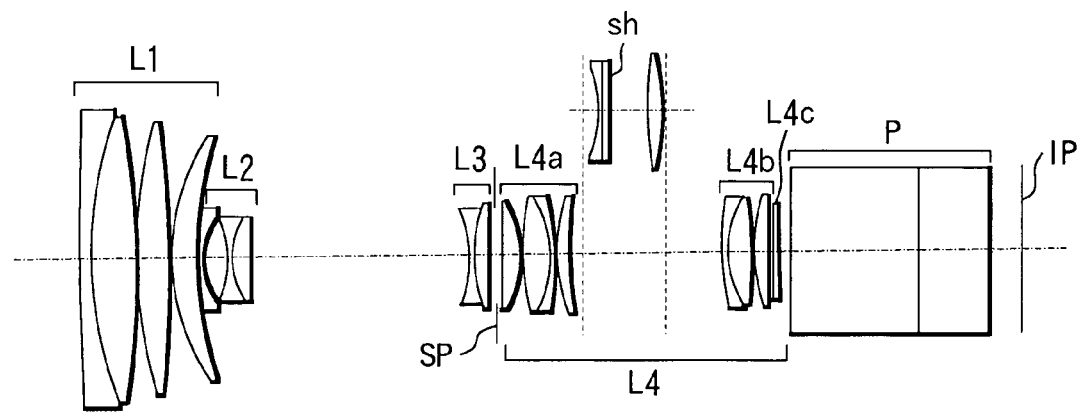
FIG. 21 shows a cross-sectional view of a zoom lens according to Embodiment 4 (Numerical Example 4) of the present invention at a wide-angle end.

Hereinafter, other embodiments of the present invention will be described with reference to the figures. FIG. 21 shows a cross-sectional view of the zoom lens at the wide-angle end according to Embodiment 4 (Numerical Example 4) of the present invention.

Figure 22:
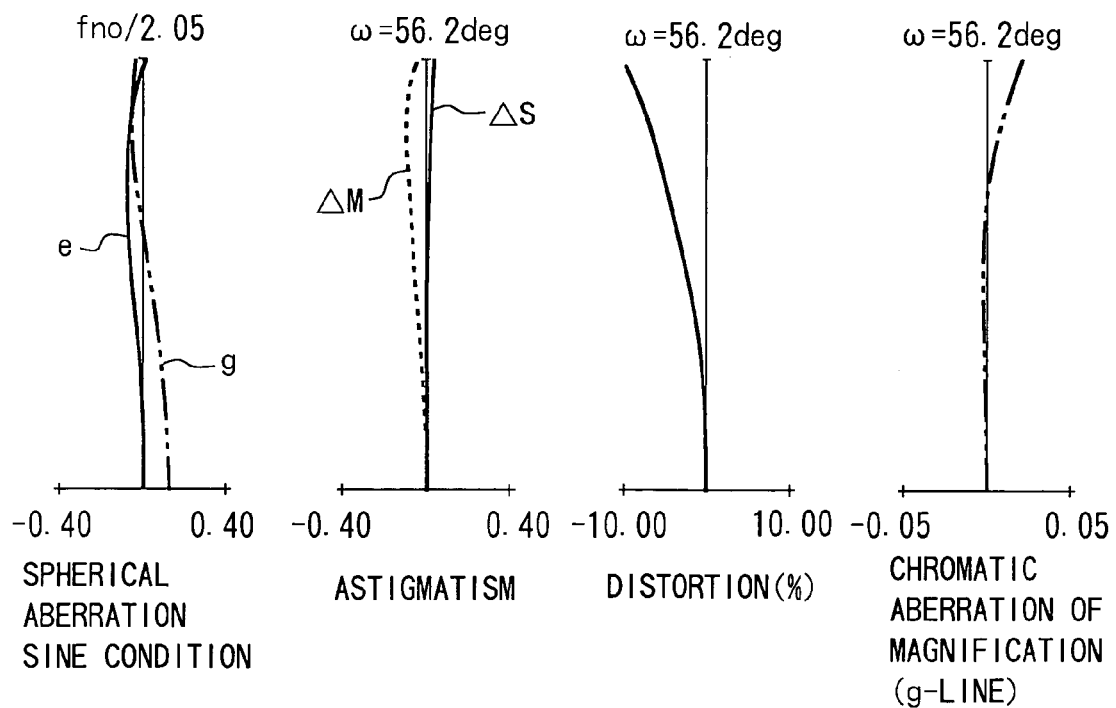
FIG. 22 shows aberration diagrams of the zoom lens according to Numerical Example 4 when f=10.30 mm and an object distance is 3 m.
Figure 23:
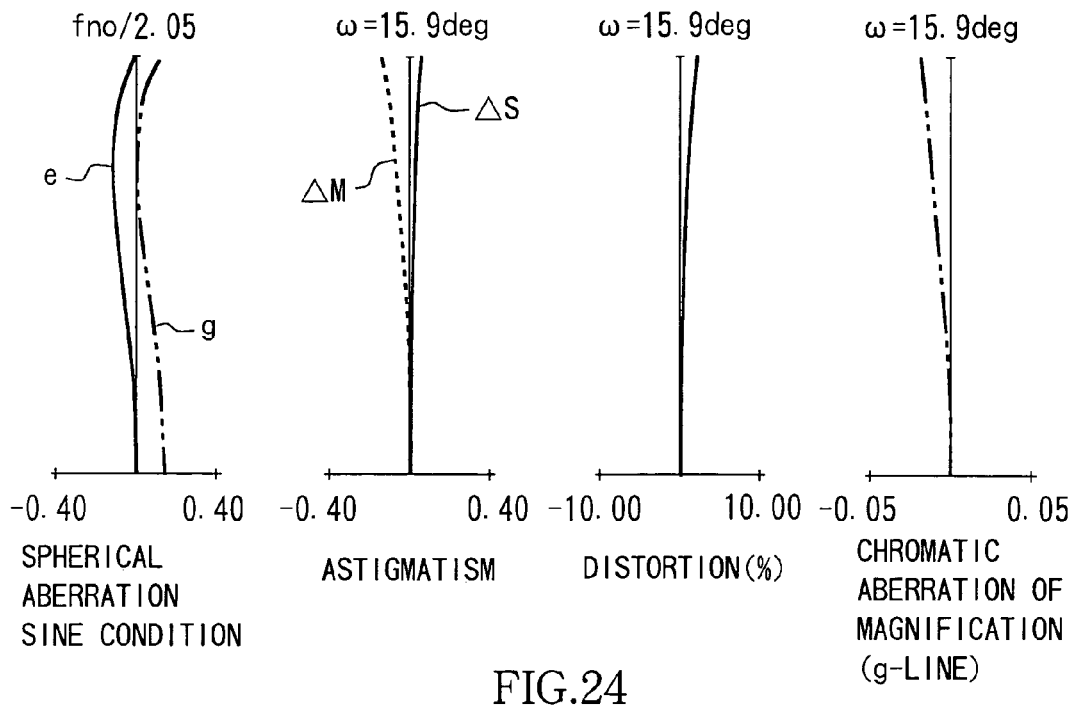
FIG. 23 shows aberration diagrams of the zoom lens according to Numerical Example 4 when f=39.45 mm and the object distance is 2.5 m.
Figure 24:
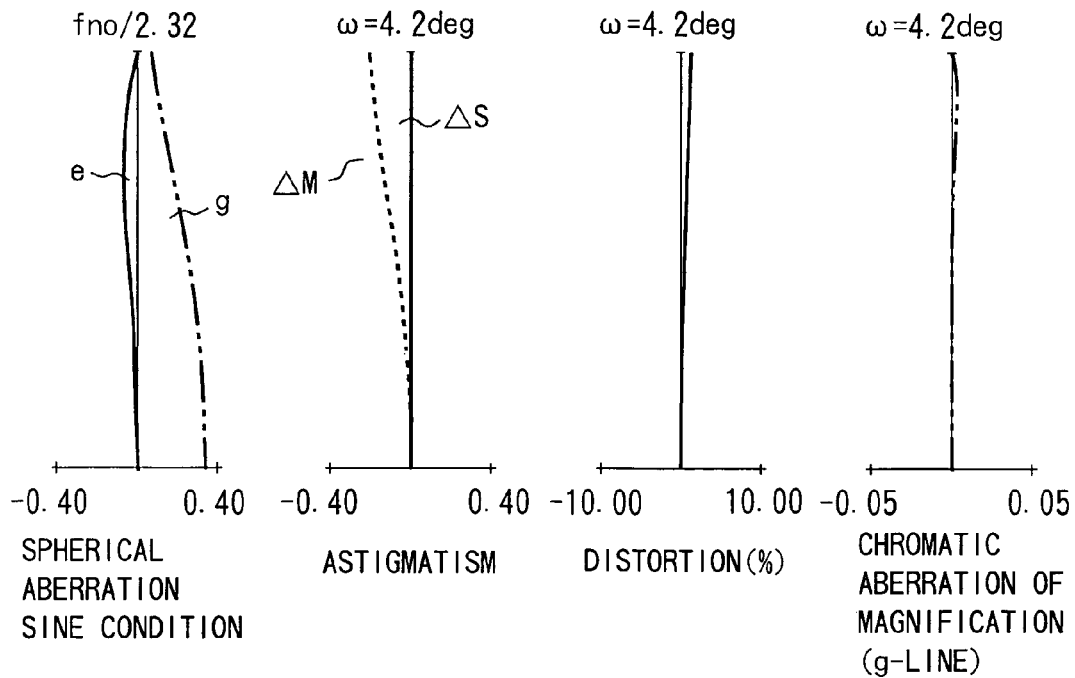
FIG. 24 shows aberration diagrams of the zoom lens according to Numerical Example 4 when f=151.10 mm and the object distance is 2.5 m.
Figure 25:
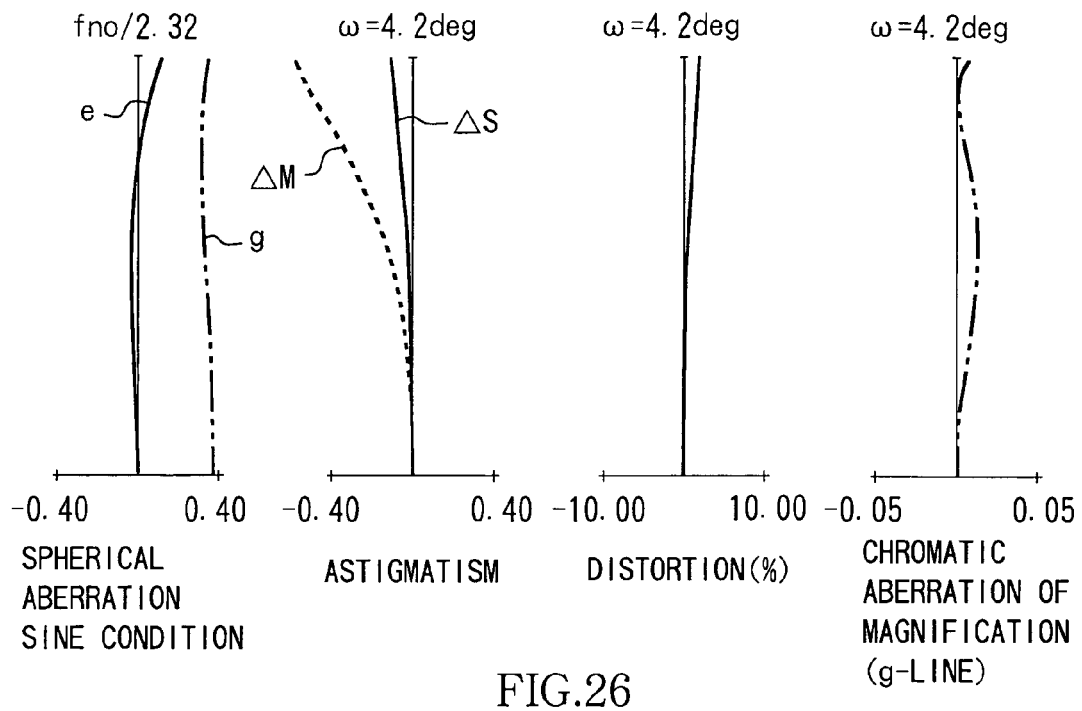
FIG. 25 shows aberration diagrams of the zoom lens according to Numerical Example 4 when f=151.10 mm and the object distance is at infinity.
Figure 26:
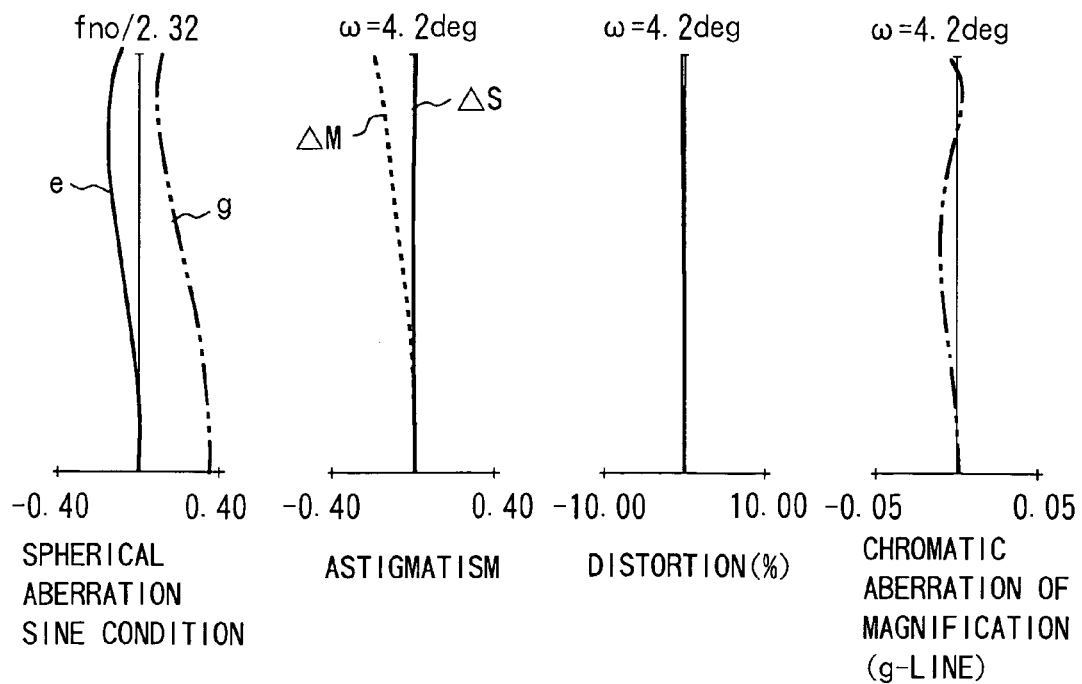
FIG. 26 shows aberration diagrams of the zoom lens according to Numerical Example 4 when f=151.10 mm and the object distance is 1 m.

FIG. 22 shows aberration diagrams of the zoom lens according to Embodiment 4 when f=10.30 mm and an object distance is 3 m, FIG. 23 shows aberration diagrams of the zoom lens according to Embodiment 4 when f=39.45 mm and the object distance is 2.5 m, FIG. 24 shows aberration diagrams of the zoom lens according to Embodiment 4 when f= 151.10 mm and the object distance is 2.5 m, FIG. 25 shows aberration diagrams of the zoom lens according to Embodiment 4 when f=151.10 mm and the object distance is at infinity, and FIG. 26 shows aberration diagrams of the zoom lens according to Embodiment 4 when f=151.10 mm and the object distance is 1 m.

Figure 27:
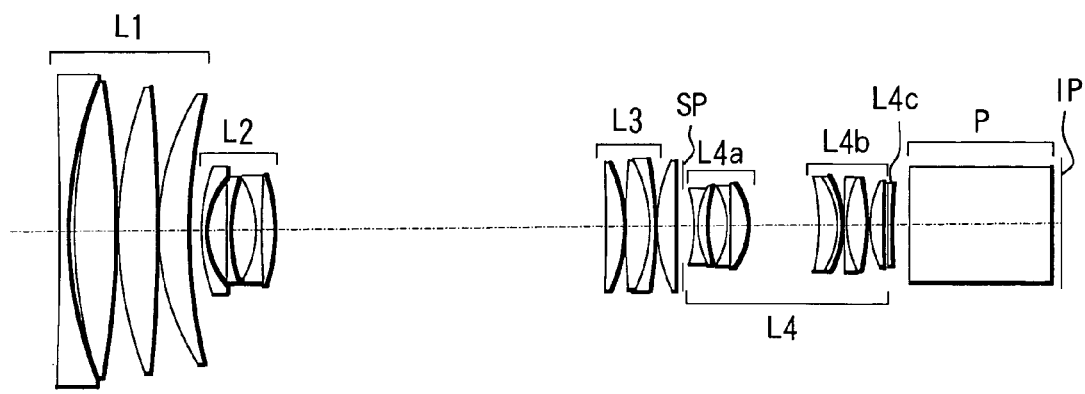
FIG. 27 shows a cross-sectional view of a zoom lens according to Embodiment 5 (Numerical Example 5) of the present invention at a wide-angle end.
Figure 28:
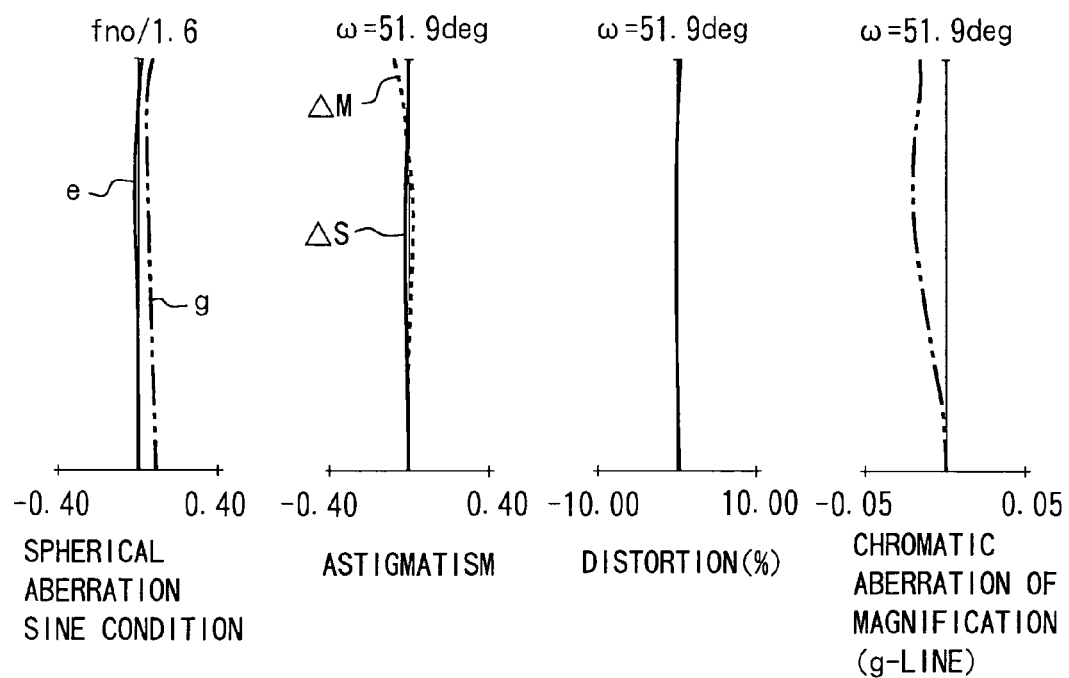
FIG. 28 shows aberration diagrams of the zoom lens according to Numerical Example 5 when f=11.30 mm and an object distance is 5 m.
Figure 29:
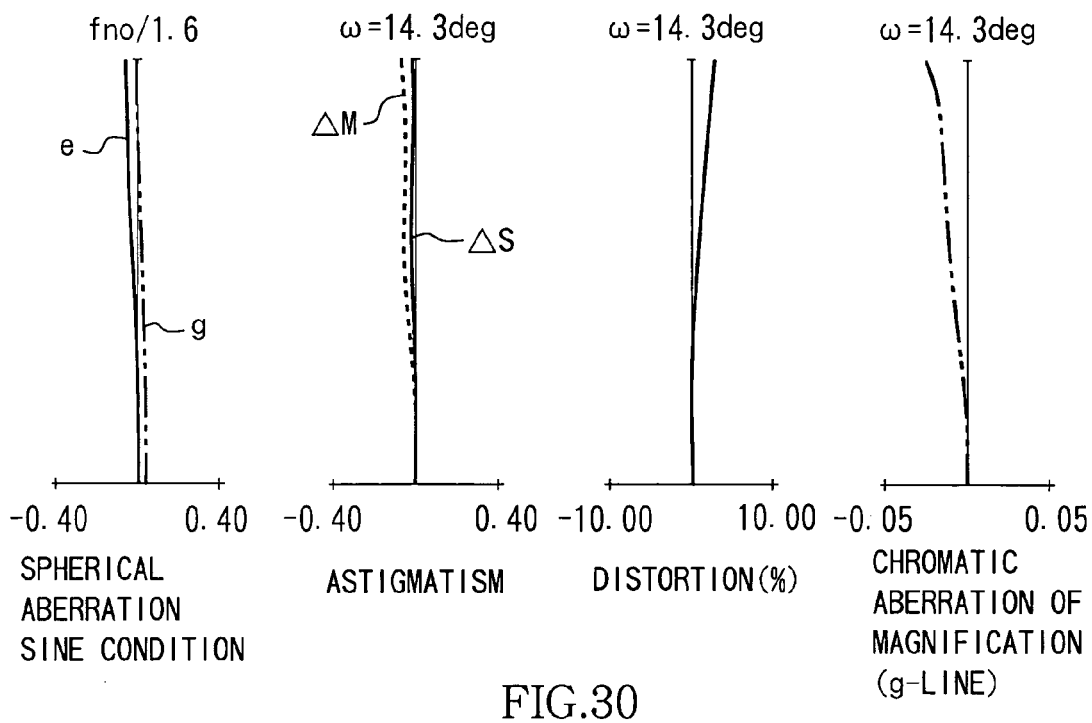
FIG. 29 shows aberration diagrams of the zoom lens according to Numerical Example 5 when f=43.84 mm and the object distance is 5 m.
Figure 30:
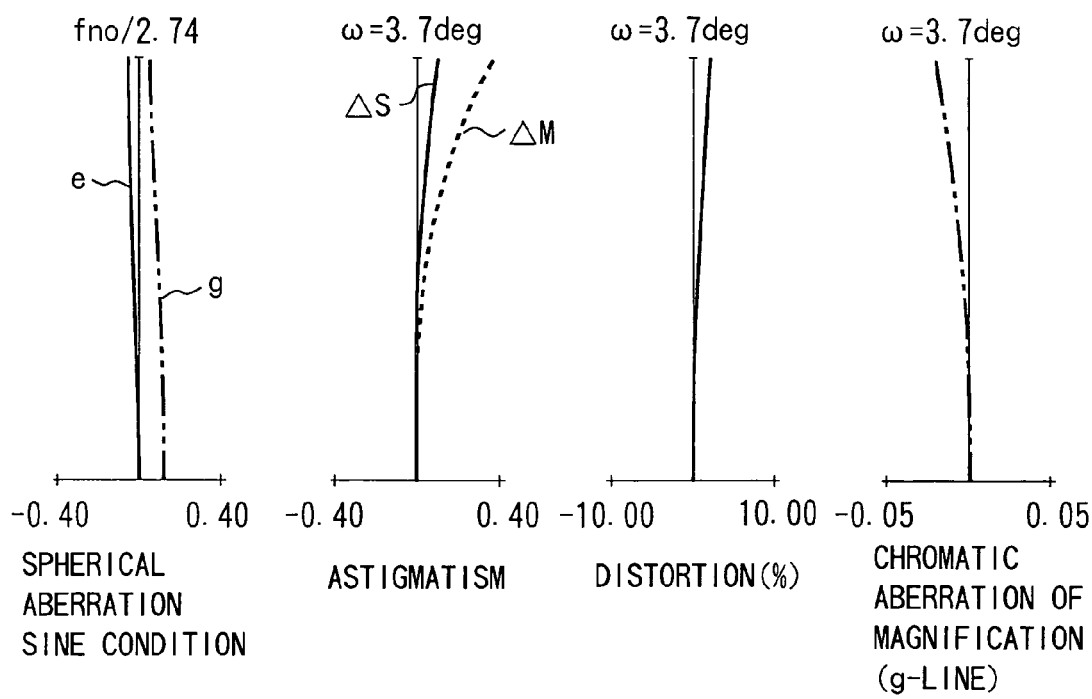
FIG. 30 shows aberration diagrams of the zoom lens according to Numerical Example 5 when f=169.52 mm and the object distance is 5 m.
Figure 31:
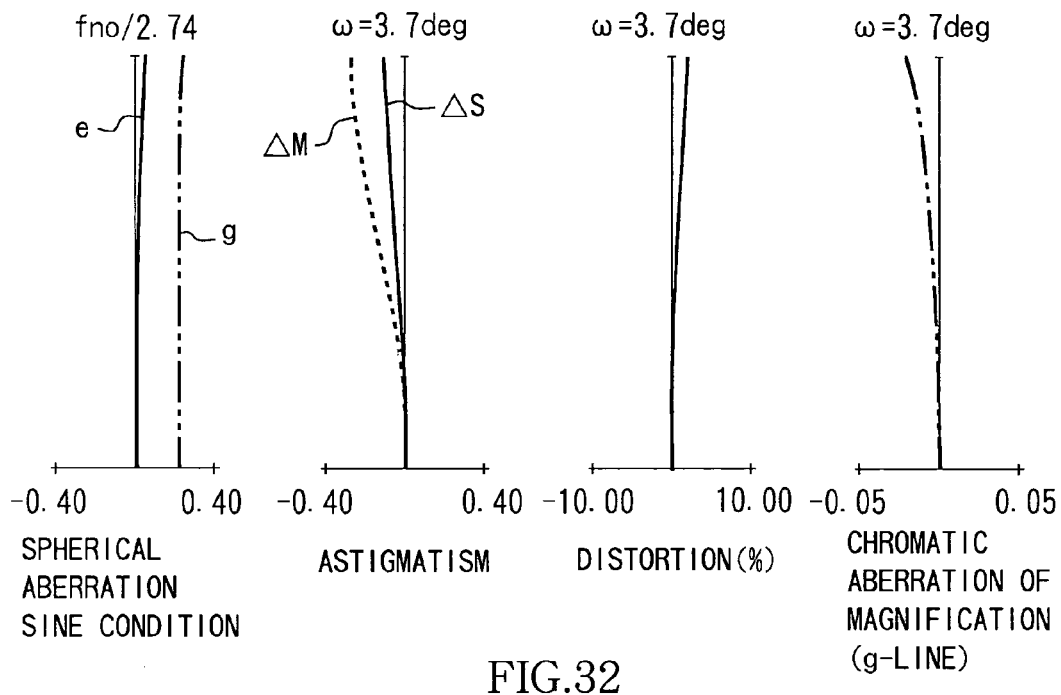
FIG. 31 shows aberration diagrams of the zoom lens according to Numerical Example 5 when f=169.52 mm and the object distance is at infinity.
Figure 32:
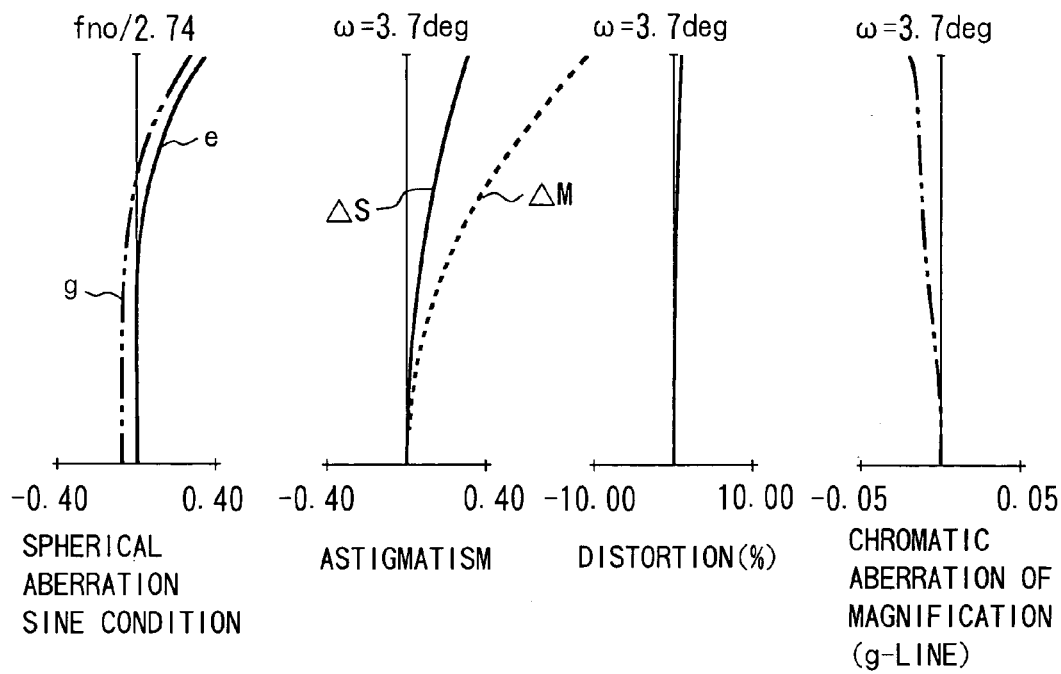
FIG. 32 shows aberration diagrams of the zoom lens according to Numerical Example 5 when f=169.52 mm and the object distance is 1 m.

FIG. 27 shows a cross-sectional view of a zoom lens at the wide-angle end according to Embodiment 5 (Numerical Example 5) of the present invention, FIG. 28 shows aberration diagrams of the zoom lens according to Embodiment 5 when f=11.30 mm and an object distance is 5 m, FIG. 29 shows aberration diagrams of the zoom lens according to Embodiment 5 when f=43.84 mm and the object distance is 5 m, FIG. 30 shows aberration diagrams of the zoom lens according to Embodiment 5 when f=169.52 mm and the object distance is 5 m, FIG. 31 shows aberration diagrams of the zoom lens according to Embodiment 5 when f=169.52 mm and the object distance is at infinity, and FIG. 32 shows aberration diagrams of the zoom lens according to Embodiment 5 when f=169.52 mm and the object distance is 1 m.

In addition, in the respective embodiments and the aberration diagrams shown in FIGS. 22 to 26 and FIGS. 28 to 32, numerical values are expressed in units of mm. A reference character f denotes a focal length. The object distance refers to the distance measured from the image surface.

Figure 33:
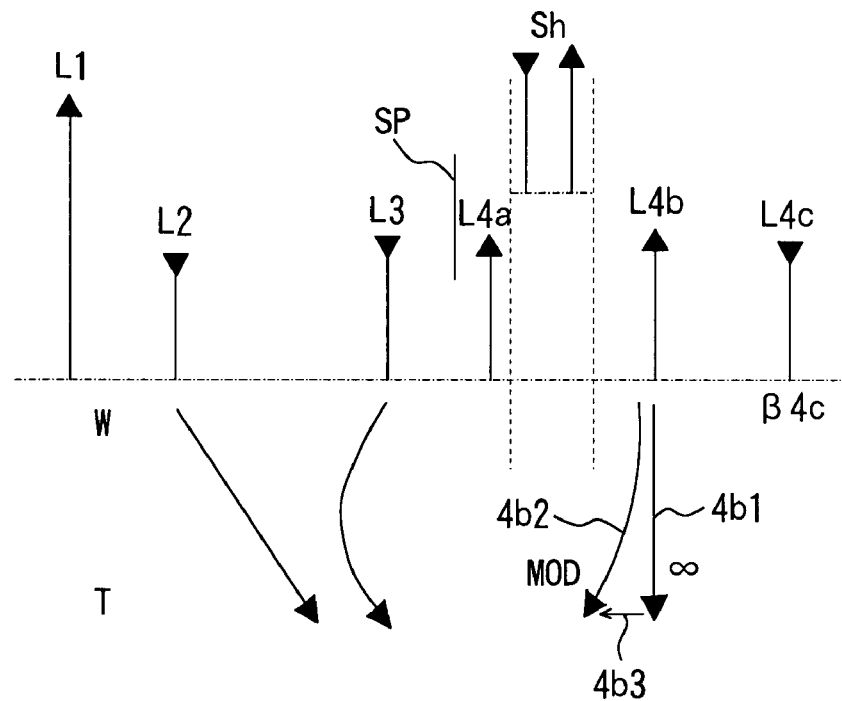
FIG. 33 shows a conceptual diagram illustrating a case where the third lens unit has a negative refractive power in the zoom lens according to Embodiments 4 and 5.
Figure 34:
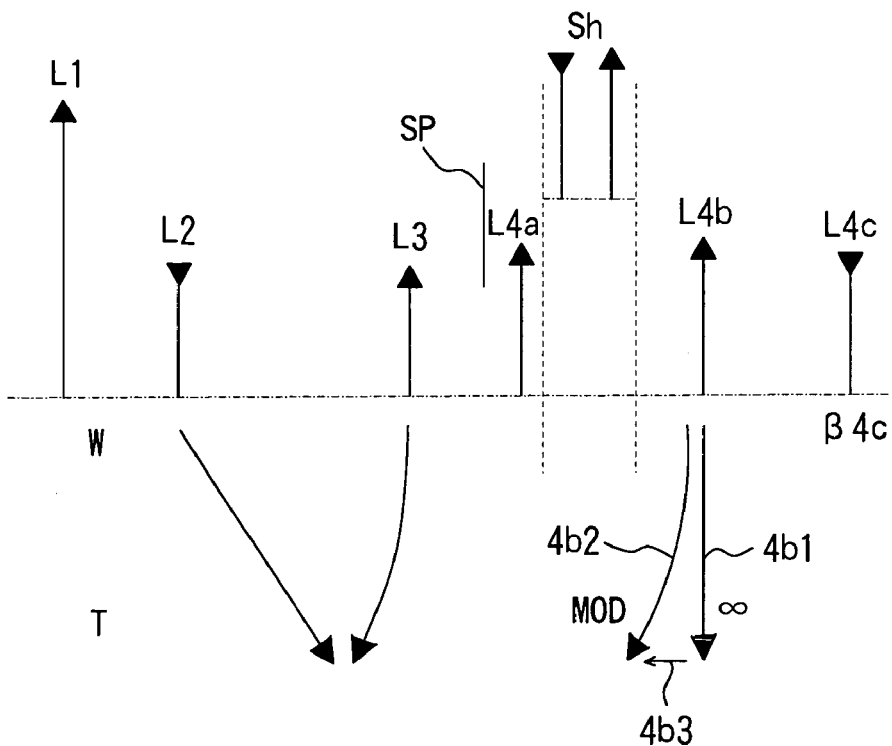
FIG. 34 shows a conceptual diagram illustrating a case where the third lens unit has a positive refractive power in the zoom lens according to Embodiments 4 and 5.

FIGS. 33 and 34 show diagrams illustrating arrangements of paraxial refractive powers in the zoom lens according to Embodiments 4 and 5, wherein FIG. 33 shows a conceptual diagram illustrating in a case where the third lens unit has a negative refractive power and FIG. 34 shows a conceptual diagram illustrating in a case where the third lens unit has a positive refractive power.

The zoom lens according to the respective embodiment is an image-taking optical system used for a image-taking system such as a video camera, a digital still camera, etc. to be described later, and in the cross-sectional views thereof, the left side is an object side (front side) and the right side is an image side (rear side).

The zoom lens according to Embodiments 4 and 5 comprises a first lens unit L1 having a positive refractive power (optical power, that is, the reciprocal of the focal length), a second lens unit L2 having a negative refractive power, a third lens unit L3 having a positive or negative refractive power, and a fourth lens unit L4 having a positive refractive power, in order from the object side to the image side. Further, during the zooming operation, the second lens unit L2 and the third lens unit L3 are moved on the optical axis.

The fourth lens unit L4 comprises a 4a lens sub-unit L4a having a positive refractive power, a 4b lens sub-unit L4b having a positive refractive power, and a 4c lens sub-unit L4c having a negative refractive power, in order from the object side to the image side. And, the focusing operation is performed by moving the 4b lens sub-unit L4b on the optical axis. Further, when the image-forming magnification of the 4c lens sub-unit L4c is represented by β4c, the following conditional expression is satisfied:

$$1 < |\beta 4c| \tag{31}$$

In the present embodiment, by defining the minimum value of the image-forming magnification β4c of the 4c lens sub-unit L4c as Conditional Expression (31), the maximum movable amount of the 4b lens sub-unit L4b is decreased, thereby reducing the size of the fourth lens unit L4. Let us define the focal length of the zoom lens at the telephoto end as being fT and the minimum object distance as being MOD. Then, the maximum displacement value Δskmax of the image-forming point due to variation of the object distance based on Expression (2) can be expressed by the following expression:

$$\Delta skmax = fT^2/(MOD-fT) \tag{32}$$

When the image-forming magnifications of the 4b lens sub-unit L4b and the 4c lens sub-unit L4c are represented by β4b and β4c, respectively, the sensitivity dsk4b of the variation of the image-forming point due to movement of the 4b lens sub-unit L4b during the focusing operation can be expressed by the following expression:

$$dsk4b = (1-\beta 4b^2)\cdot \beta 4c^2 \tag{33}$$

Since the maximum movable amount Δxmax of the 4b lens sub-unit is proportional to Δskmax and 1/dsk4b, the following relationship is obtained:

$$\Delta xmax \propto fT^2/\{(MOD-fT)\cdot(1-\beta 4b^2)\cdot \beta 4c^2\} \tag{34}$$

Since it can be seen from Expression (34) that Δxmax is proportional to $1/\beta 4c^2$, by setting 1<|β4c|, the maximum movable amount Δxmax is reduced and a space for movement is reduced, so that it is possible to reduce the size of the fourth lens unit L4.

During the zooming operation from the wide-angle side to the telephoto side, the second lens unit L2 is moved on the optical axis from the object side to the image side. As shown in FIGS. 33 and 34, when the third lens unit L3 has a negative refractive power, the third lens unit L3 is moved on the optical axis to the object side and then is moved to the image side.

In addition, when the third lens unit L3 has a positive refractive power, the third lens unit L3 is moved on the optical axis from the image side to the object side. In the mean time, the third lens unit goes through a zoom state where the image-forming magnification is −1 (in other words, passes through such a zoom position).

In FIGS. 33 and 34, reference characters W and T denote the zoom positions of the wide-angle end and the telephoto end, respectively, a reference character ∞ denotes an object at infinity, and a reference character MOD denotes the minimum object distance.

In addition, the zoom lens according to Embodiments 4 and 5 employs a rear focusing type in which the focusing operation is performed by moving the 4b lens sub-unit L4b on the optical axis. Lines 4b1 and 4b2 associated with the 4b lens sub-unit L4b denote moving tracks for correcting for the variation of image surface due to the zooming during the focusing operation performed for the object at infinity and the close range object.

In the above embodiments, for example, when the focusing operation is performed from the object at infinity to the close range object, the 4b lens sub-unit L4b is moved toward the front side as shown by an arrow 4b3.

By using the second lens unit L2 as the zoom variator lens unit and the third lens unit L3 as an image-surface variation compensating unit for correcting for variation of an image surface due to the zooming, that is, by making the focus lens unit independent from the imaging-point variation compensating unit, the second lens unit L2 and the third lens unit L3 can be driven with a driving mechanism such as a cam, etc. independently of the focus lens unit, thereby making the manual zoom operation possible.

In addition, when the image-forming magnification of the 4b lens sub-unit L4b is represented by β4b, the zoom lens satisfies the following conditional expression:

$$1 < |(1-\beta 4b^2)\cdot \beta 4c^2| \tag{35}$$

Alternatively, the following conditional expression is satisfied:

$$-0.3 < \beta 4b < 0.3 \tag{a}$$

It is more preferable that the following conditional expression is satisfied:

$$-0.2 < \beta 4b < 0.2 \tag{b}$$

In addition, in the present embodiment, let us define the image-forming magnification of the whole system of the zoom lens at an arbitrary zoom position as being β, the image-forming magnification of the first lens unit L1 as being β1, a position on the optical axis of the first lens unit L1 as being x0 where the image-forming magnifications, in a state that the focusing operation is not performed by the 4b lens sub-unit L4b, are β=0 and β1=0, the combined image-forming magnification by the second lens unit L2 through the fourth lens unit L4 as being β234, an F number of the whole system as being F, and the minimum diameter of a confusion circle as being δ. Then, the focusing operation with the 4b lens sub-unit L4b is performed, when the position x on the optical axis of the first lens unit L1 satisfies the following conditional expression:

$$|(x-x0)\cdot(\beta 234)^2/(\delta F)| < 1 \tag{36}$$

By limiting the maximum value of the image-forming magnification of the 4b lens sub-unit L4b in accordance with Conditional Expression (35), the maximum movable amount Δxmax of the 4b lens sub-unit L4b can be further decreased, thereby further reducing the size of the fourth lens unit L4.

In the present embodiment, the auto focusing operation is performed with the 4b lens sub-unit L4b and the manual focusing operation is performed with the whole unit or a part of the first lens unit L1.

In this way, by moving the whole unit or a part of the first lens unit L1 as the manual focus unit on the optical axis, the focusing operation is made possible, thereby making the manual focusing operation and the auto focusing operation compatible.

In addition, in the present embodiment, by moving the whole unit or a part of the fourth lens unit L4, it is possible to make the flange back adjustment which is necessary for a zoom lens with a lens interchangeable manual focusing mode.

In addition, only when the first lens unit L1 as the manual focus unit is an in-focus state in response to the object at infinity, the 4b lens sub-unit L4b as the auto focus unit performs the auto focusing operation.

When the minimum diameter of a confusion circle of the image-taking system is δ and the F number thereof is F, a focal depth D of the zoom lens is expressed by the following expression.

$$D = \delta F \tag{37}$$

Then, let us define a position of a principal point of the first lens unit L1 as being x, a position of the principal point of the first lens unit L1 when achieving the in-focus in response to the object at infinity as being x0, and the combined image-forming magnification of the second lens unit L2 through the fourth lens unit L4 as being β234. Then, the displacement amount Δsk of the image-forming position due to movement of the first lens unit L1 is expressed by the following expression.

$$\Delta sk = (x-x0) \cdot (\beta 234)^2 \tag{38}$$

Therefore, when Expression (36) is satisfied, the first lens unit L1 can be considered as achieving the in-focus in response to the object at infinity within the focal depth.

In Embodiment 4 shown in FIG. 21, an image-size conversion optical system sh, which can be inserted into and removed from the optical path of the zoom lens, is provided closer to the object side than the 4b lens sub-unit L4b in the fourth lens unit L4. When a conversion magnification of the image-size conversion optical system sh is represented by βsh, the following conditional expression is satisfied:

$$\beta sh < 1$$

In this case, the maximum movable amount of the 4b lens sub-unit L4b is defined as shmax in a state where the image-size conversion optical system sh is inserted into the optical path and the maximum movable amount of the 4b lens sub-unit L4b is defined as smax in a state where the image-size conversion optical system sh is not inserted into the optical path. Then, the following conditional expression is satisfied:

$$0.9 < sh\max/(\beta sh^2 \cdot s\max) < 1.1 \tag{39}$$

As a result, conversion of a focal length range can be efficiently performed.

By allowing the maximum movable amount Δshmax to satisfy Conditional Expression (39) when the image-size conversion optical system sh is inserted, the close range object is substantially invariable in the two states where the image-size conversion optical system sh is inserted and not inserted. When the difference between the movable amounts is less than 10%, it has been actually known that there is no sense of discomfort.

Embodiment 4

In FIG. 21, a reference character L1 denotes a focus lens unit (front lens unit) having a positive refractive power as a first lens unit. A reference character L2 denotes a variator lens unit (zoom lens unit) having a negative refractive power for zooming as a second lens unit and performs the zooming from the wide-angle end to the telephoto end with monotonous movement on the optical axis toward the image side. A reference character L3 denotes a compensator lens unit (image-surface variation compensating unit) having a negative refractive power as a third lens unit and is nonlinearly moved on the optical axis along a convex track toward the object side so as to correct for the variation of image surface due to the zooming. The variator lens unit L2 and the compensator lens unit L3 constitute a zoom system.

A reference character SP denotes an aperture stop, and a reference character L4 denotes a relay lens unit having a positive refractive power as a fourth lens unit and being fixed during the zooming operation. The fourth lens unit L4 has three lens sub-units L4a, L4b, and L4c. A reference character P denotes an optical element such as a color-separating prism, an optical prism, etc. and is shown as a glass block in the figure.

A reference character IP denotes an image surface. When the zoom lens is used as an image-taking optical system of a video camera or a digital still camera, an image-taking plane of a solid-state image pickup device (photoelectric conversion element) such as a CCD sensor, a CMOS sensor, etc. is disposed on the image surface IP and when the zoom lens is used for an image-taking optical system of a silver-halide film camera, a film plane is disposed on the image surface IP.

In the aberration diagrams, reference characters e and g denote the e line and g line, respectively, reference characters ΔM and ΔS denote a meridional image surface and a sagittal image surface, respectively, and a chromatic aberration of magnification is specified by the g line.

Next, features of the fourth lens unit L4 according to Embodiment 4 will be explained. The fourth lens unit L4 has a positive refractive power as a whole and comprises a 4a lens sub-unit L4a having a positive refractive power, a 4b lens sub-unit L4b having a positive refractive power, and a 4c lens sub-unit L4c having a negative refractive power, in order from the object side to the image side. Here, the 4b lens sub-unit L4b is a focus lens unit and is moved on the optical axis to the object side when performing the focusing operation to a close range object from an object at infinity.

During auto focusing operation, the 4b lens sub-unit L4b is driven using a known auto focusing mechanism.

In the present embodiment, when the close range object (with the closest object distance where the image-taking can be performed) is placed at 1 m, the maximum movable amount Δxmax of the 4b lens sub-unit L4b from an object at infinity to the close range object during the focusing operation is −12.4 mm with the movement amount toward the image side set to be positive. A value of the right side of Expression (34) is obtained to be:

(right side of Expression $(34)) = 151.1^2/\{(-1000-151.1) \cdot (1-0.1788^2) \cdot 1.1014^2\} = -16.9$ Since the maximum movable amount Δxmax is proportional to $1/\beta 4c^2$, with β4c=1.1 in the present embodiment, the maximum movable amount Δxmax is decreased by about 18% and a space for movement is reduced, thereby accomplishing size reduction of the fourth lens unit L4.

In the present embodiment, the second lens unit L2 is used as a zoom lens unit having a negative refractive power and the third lens unit L3 is used as an image-surface variation compensating unit having a negative refractive power, so that the focus lens unit (4b lens sub-unit) L4b is provided separately from the image-surface variation compensating unit L3. By allowing the second lens unit L2 and the third lens unit L3 to be movable independently of the focus lens unit L4b with a driving mechanism such as a cam, etc., it is possible to perform the manual zoom operation.

Further, The image-forming magnification β4b of the 4b lens sub-unit L4b in the present embodiment is 0.179 and satisfies Expression (a).

In addition, in the present embodiment, by making it possible to perform the focusing operation in which the whole unit or a part of the first lens unit L1 as the manual focus unit is moved on the optical axis, the manual focusing operation and the auto focusing operation become compatible. By moving the whole unit or a part of the fourth lens unit L4 on the optical axis, it is possible to make the flange back adjustment which is necessary for the zoom lens with a lens interchangeable manual focusing type.

Further, in the present embodiment, only when the first lens unit L1 as the manual focus unit is an in-focus state in response to the object at infinity, the auto focusing operation is performed with movement of the 4b lens sub-unit L4b as the auto focus unit.

For the wide-angle end and the telephoto end of the zoom lens according to the present embodiment, Table 8 gives an F number Fno, a focal depth D, a combined image-forming magnification β234 of the second lens unit L2 through the fourth lens unit L4, and a difference |x−x0| between the reference position x0 of the first lens unit L1 and the position x of the first lens unit L1 in a state where the aperture stop is opened. In consideration of a ⅔ inch-type image-forming element in accordance with NTSC, the minimum diameter of a confusion circle δ is set to 0.021 mm.

TABLE 8

|   | f | δ | FNo. | D | β234 | |x − x0| |
|---|---|---|---|---|---|---|
| W | 10.30 | 0.021 | 2.05 | 0.043 | 0.1345 | 2.377 |
| T | 151.10 | 0.021 | 2.32 | 0.049 | 1.9731 | 0.0125 |

According to Table 8, |x−x0|<2.377 mm at the wide-angle end in the state where the aperture stop is opened and thus the left side of Conditional Expression (36) becomes 0.9988. In addition, |x−x0|<0.0125 mm at the telephoto end and thus the left side of Conditional Expression (36) becomes 0.9989. When Conditional Expression (36) is satisfied, the focusing operation is performed with the 4b lens sub-unit L4b.

In the present embodiment, an image-size conversion optical system sh which can be inserted into and removed from the optical path with the conversion magnification of βsh=0.83 is provided at the object side of the 4b lens sub-unit L4b. The focal length of the whole system becomes 0.83 times in a state where the image-size conversion optical system sh is inserted into the optical path, the maximum movable amount Δshmax of the 4b lens sub-unit L4b during the focusing operation becomes −8.3 mm when the close range object is placed at 1 m, and the focal length becomes 0.67 times in a state where the image-size conversion optical system sh is not inserted into the optical path. These are matched with Expression (34). Therefore, Expression (35) is satisfied, so that the distance from the close range object is substantially invariable in the two states where the image-size conversion optical system sh is inserted and not inserted into the optical path. If a difference between the movable amounts is less than 10%, it has been actually known that there is no sense of discomfort.

Embodiment 5

In FIG. 27, a reference character L1 denotes a focus lens unit (front lens unit) having a positive refractive power as a first lens unit. A reference character L2 denotes a variator lens unit having a negative refractive power for varying magnification as a second lens unit and performs zooming from the wide-angle end to the telephoto end with monotonous movement on the optical axis toward the image side. A reference character L3 denotes a compensator lens unit having a positive refractive power as a third lens unit and is monotonously and nonlinearly moved on the optical axis toward the object side so as to correct for the variation of image surface due to the zooming. The variator lens unit L2 and the compensator lens unit L3 constitute a zoom system.

A reference character SP denotes an aperture stop, and a reference character L4 denotes a relay lens unit having a positive refractive power as a fourth lens unit and being fixed (not moved) during the zooming. The relay lens unit L4 has three sub-units L4a, L4b, and L4c. A reference character P denotes an optical element such as a color-separating prism, an optical filter, etc. and is shown as a glass block in the figure.

Next, features of the fourth lens unit L4 according to Embodiment 5 will be explained. The fourth lens unit L4 has a positive refractive power as a whole and comprises a 4a lens sub-unit L4a having a negative refractive power, a 4b lens sub-unit L4b having a positive refractive power, and a 4c lens sub-unit L4c having a negative refractive power, in order from the object side to the image side. Here, the 4b lens sub-unit L4b is a focus lens unit and is moved on the optical axis to the object side during the focusing operation from an object at infinity to a close range object.

In the present embodiment, when the close range object is placed at 1 m, the maximum movable amount Δxmax of the 4b lens sub-unit L4b from the object at infinity to the close range object during the focusing operation is −13.1 mm with the movement amount toward the image side set to be positive. A value of the right side of Expression (34) can be calculated to be as follows:

(right side of Expression (34))=$169.52^2$/{(−1000−169.52)·(1−$0.0707^2$)·$1.103^2$}=−20.3

Since the maximum movable amount Δxmax is proportional to $1/\beta 4c^2$, by setting β4c=1.1 in the present embodiment, the maximum movable amount Δxmax is decreased by 18% and a space for movement is reduced, thereby accomplishing size reduction of the fourth lens unit L4.

In the present embodiment, the second lens unit L2 is used as a zoom lens unit having a negative refractive power and the third lens unit L3 is used as an image-point variation compensating unit having a positive refractive power, so that the focus lens unit (the 4b lens sub-unit L4b) is provided separately from the image-point variation compensating unit L3. By allowing the second lens unit L2 and the third lens unit L3 to be movable independently of the 4b lens sub-unit L4b with a driving mechanism such as a cam, etc., it is possible to make the zooming by manual operation.

Further, the image-forming magnification β4b of the 4b lens sub-unit L4b in the present embodiment is 0.0707 and satisfies Expression (a).

In addition, in the present embodiment, by making it possible to perform the focusing operation through movement of the whole unit or a part of the first lens unit L1 as the manual focus unit on the optical axis, the manual focusing operation and auto focusing operation become compatible. Further, by moving the whole unit or a part of the fourth lens unit L4 on the optical axis, it is possible to embody a flange back adjustment mechanism which is necessary for the zoom lens with a lens interchangeable manual focusing type.

Further, in the present embodiment, only when the first lens unit L1 as the manual focus unit is an in-focus state in response to the object at infinity, the auto focusing operation is performed with the 4b lens sub-unit L4b as the auto focus unit.

For the wide-angle end and the telephoto end of the zoom lens according to the present embodiment, Table 9 gives an F number Fno, a focal depth D, a combined image-forming magnification β234 of the second lens unit L2 through the fourth lens unit L4, and a position difference |x−x0| when the aperture stop is opened. In consideration of a ⅔ inch-type image-taking element in accordance with NTSC, the minimum diameter of a confusion circle δ is set to 0.021 mm.

TABLE 9

|   | f | δ | FNo. | D | β234 | \|x − x0\| |
|---|---|---|---|---|---|---|
| W | 11.30 | 0.021 | 1.60 | 0.034 | 0.0851 | 4.641 |
| T | 169.52 | 0.021 | 2.74 | 0.058 | 1.2766 | 0.035 |

According to Table 9, |x−x0|<4.641 mm at the wide-angle end in the state where the aperture stop is opened and thus the left side of Conditional Expression (36) becomes 1.000. In addition, |x−x0|<0.035 mm at the telephoto end and thus the left side of Conditional Expression (36) becomes 0.9913. When Conditional Expression (36) is satisfied, the focusing operation is performed with the 4b lens sub-unit L4b.

The detailed structural aspects of Numerical Examples 4 and 5 are given below in Tables 10 and 11. In the respective numerical examples, a reference character i denotes the order of a surface from the object side, a reference character ri denotes the radius of curvature of each surface, a reference character di denotes the thickness of a medium or the air gap between the i-th surface and the (i+1)-th surface, and reference characters ni and vi denote the refractive index and the Abbe's number of the e line, respectively. Three surfaces closest to the image side in Numerical Example 4 and two surfaces closest to the image side in Numerical Example 5 are planes corresponding to a glass block.

A reference character f denotes a focal length, a reference character fno denotes an F number, and a reference character ω denotes half the field angle. In addition, Table 12 gives various numerical values of Numerical Examples corresponding to Conditional Expressions described above.

TABLE 10 f = 10.29991 fno = 1:2.05 2ω = 56.2

| r1 = 1169.481 | d1 = 2.40 | n1 = 1.81265 | v1 = 25.4 |
| r2 = 98.429 | d2 = 10.83 | n2 = 1.51825 | v2 = 64.2 |
| r3 = −265.170 | d3 = 0.20 | | |
| r4 = 124.037 | d4 = 8.29 | n3 = 1.60548 | v3 = 60.7 |
| r5 = −281.395 | d5 = 0.20 | | |
| r6 = 51.797 | d6 = 6.46 | n4 = 1.64254 | v4 = 60.1 |
| r7 = 97.915 | d7 = VARIABLE | | |
| r8 = 71.045 | d8 = 0.90 | n5 = 1.82017 | v5 = 46.6 |
| r9 = 17.601 | d9 = 6.01 | | |
| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = −4295.134 | d12 = VARIABLE | | |
| r13 = −27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = VARIABLE | | |
| r16 = APERTURE STOP | d16 = 1.60 | | |
| r17 = 2000.000 | d17 = 4.71 | n10 = 1.62033 | v10 = 63.3 |
| r18 = −27.929 | d18 = 0.20 | | |
| r19 = 70.191 | d19 = 6.52 | n11 = 1.48915 | v11 = 70.2 |
| r20 = −26.428 | d20 = 1.20 | n12 = 1.83932 | v12 = 37.2 |
| r21 = −77.216 | d21 = 0.20 | | |
| r22 = 42.718 | d22 = 3.31 | n13 = 1.48915 | v13 = 70.2 |
| r23 = 101.123 | d23 = 37.00 | | |
| r24 = 68.737 | d24 = 1.20 | n14 = 1.69417 | v14 = 31.1 |
| r25 = 23.320 | d25 = 6.27 | n15 = 1.48915 | v15 = 70.2 |
| r26 = −88.136 | d26 = 0.20 | | |
| r27 = 39.853 | d27 = 3.95 | n16 = 1.52458 | v16 = 59.8 |
| r28 = −1000.000 | d28 = 1.00 | | |
| r29 = ∞ | d29 = 1.00 | n17 = 1.51825 | v17 = 64.1 |
| r30 = 200.000 | d30 = 3.80 | | |

TABLE 10-continued

| r31 = ∞ | d31 = 30.00 | n18 = 1.60718 | v18 = 38.0 |
| r32 = ∞ | d32 = 16.20 | n19 = 1.51825 | v19 = 64.2 |
| r33 = ∞ | | | |

FOCAL LENGTH

| VARIABLE DISTANCE | 11.30 | 21.65 | 43.84 | 80.92 | 169.52 |
|---|---|---|---|---|---|
| d 8 | 4.10 | 31.10 | 51.40 | 63.60 | 73.64 |
| d 12 | 110.05 | 77.31 | 48.78 | 27.19 | 2.06 |
| d 15 | 2.05 | 7.79 | 16.02 | 25.41 | 40.50 |

TABLE 11 f = 11.29963 fno = 1:1.6 2ω = 51.9

| r1 = −1596.517 | d1 = 3.09 | n1 = 1.68893 | v1 = 81.1 |
| r2 = 144.316 | d2 = 1.45 | | |
| r3 = 160.745 | d3 = 14.30 | n2 = 1.48749 | v2 = 70.2 |
| r4 = −314.770 | d4 = 0.21 | | |
| r5 = 140.886 | d5 = 13.60 | n3 = 1.48749 | v3 = 70.2 |
| r6 = −566.909 | d6 = 0.21 | | |
| r7 = 86.479 | d7 = 10.56 | n4 = 1.51633 | v4 = 64.2 |
| r8 = 208.360 | d8 = VARIABLE | | |
| r9 = 70.957 | d6 = 1.65 | n5 = 1.77250 | v5 = 49.6 |
| r10 = 29.208 | d10 = 6.76 | | |
| r11 = −2104.508 | d11 = 1.51 | n6 = 1.77250 | v6 = 49.6 |
| r12 = 59.821 | d12 = 8.57 | | |
| r13 = −32.423 | d13 = 1.51 | n7 = 1.77250 | v7 = 49.6 |
| r14 = 345.764 | d14 = 4.32 | n8 = 1.92286 | v8 = 21.3 |
| r15 = −65.282 | d15 = VARIABLE | | |
| r16 = −535.129 | d16 = 6.13 | n9 = 1.48749 | v9 = 70.2 |
| r17 = −50.925 | d17 = 0.21 | | |
| r18 = 263.617 | d18 = 8.55 | n10 = 1.64000 | v10 = 60.1 |
| r19 = −47.422 | d19 = 1.65 | n11 = 1.80518 | v11 = 25.4 |
| r20 = −147.421 | d20 = 0.21 | | |
| r21 = 53.825 | d21 = 7.03 | n12 = 1.48749 | v12 = 70.2 |
| r22 = −646.250 | d22 = VARIABLE | | |
| r23 = (APERTURE STOP) | d23 = 4.10 | | |
| r24 = −41.246 | d24 = 0.96 | n13 = 1.65160 | v13 = 58.5 |
| r25 = 29.932 | d25 = 3.44 | n14 = 1.69895 | v14 = 30.1 |
| r26 = 64.086 | d26 = 8.58 | | |
| r27 = −24.707 | d27 = 1.03 | n15 = 1.64000 | v15 = 60.1 |
| r28 = −246.313 | d28 = 5.79 | n16 = 1.68893 | v16 = 31.1 |
| r29 = −27.101 | d29 = 23.38 | | |
| r30 = −82.819 | d30 = 8.19 | n17 = 1.54814 | v17 = 45.8 |
| r31 = −30.079 | d31 = 1.51 | n18 = 1.71736 | v18 = 29.5 |
| r32 = −40.080 | d32 = 0.14 | | |
| r33 = 198.497 | d33 = 1.31 | n19 = 1.84666 | v19 = 23.9 |
| r34 = 39.158 | d34 = 7.07 | n20 = 1.48749 | v20 = 70.2 |
| r35 = −56.415 | d35 = 0.76 | | |
| r36 = 35.894 | d36 = 4.97 | n21 = 1.48749 | v21 = 70.2 |
| r37 = −298.217 | d37 = 1.00 | | |
| r38 = ∞ | d38 = 1.00 | n22 = 1.48749 | v22 = 70.2 |
| r39 = 200.000 | d39 = 5.70 | | |
| r40 = ∞ | d40 = 47.57 | n23 = 1.51633 | v23 = 64.2 |
| r41 = ∞ | | | |

FOCAL LENGTH

| VARIABLE DISTANCE | 10.30 | 20.60 | 39.45 | 117.42 | 151.10 |
|---|---|---|---|---|---|
| d 7 | 0.39 | 20.78 | 33.92 | 47.57 | 49.55 |
| d 15 | 52.91 | 29.89 | 14.80 | 3.37 | 3.78 |
| d 22 | 1.55 | 4.18 | 6.13 | 3.91 | 1.53 |

TABLE 12

| CONDITIONAL EXPRESSION | NUMERICAL EXAMPLE 4 | NUMERICAL EXAMPLE 5 |
|---|---|---|
| $1 < \beta 4c$ (31) | 1.1014 | 1.103 |
| $\|(1 - \beta 4b^2) \cdot \beta 4c^2\| > 1$ (35) | 1.174 | 1.211 |
| $\|(x - x0) \cdot (\beta 234)^2/(\delta F)\| < 1$ (36) | Wide: 0.9988 Tele: 0.9989 | Wide: 1.0000 Tele: 0.9913 |

TABLE 12-continued

| CONDITIONAL EXPRESSION | NUMERICAL EXAMPLE 4 | NUMERICAL EXAMPLE 5 |
|---|---|---|
| $\beta sh < 1$ | 0.83 | — |
| $0.9 < shmax/(\beta sh^2 \cdot smax) < 1.1$ (39) | 0.972 | — |
| $\beta 4b$ | 0.1788 | 0.0707 |

As explained above, according to the zoom lens of Embodiments 4 and 5, the zoom ratio is increased, the maximum movable amount of the focus lens unit is decreased, the size of the whole system of the lens is reduced, and a high optical performance is obtained over the whole object distance range.

In addition, according to the zoom lens of Embodiments 4 and 5, by employing the rear focusing type in which the focus lens unit is provided closer to the image side than the zoom lens unit and by disposing the fixed lens unit having the absolute value of the image-forming magnification or conversion magnification larger than 1 at the image side of the focus lens unit, it is possible to repress the maximum movable amount of the focus lens unit during the focusing operation and thus to easily accomplish size reduction of the whole system of the lens with a high zooming ratio.

Hereinafter, a video camera and a digital camera using the zoom lens according to the above embodiments as an image-taking optical system will be explained with reference to FIGS. 35 and 36. In addition, FIG. 37 illustrates the structure of a video camera system using the zoom lens according to the above embodiments as an interchangeable lens system.

Figure 35:
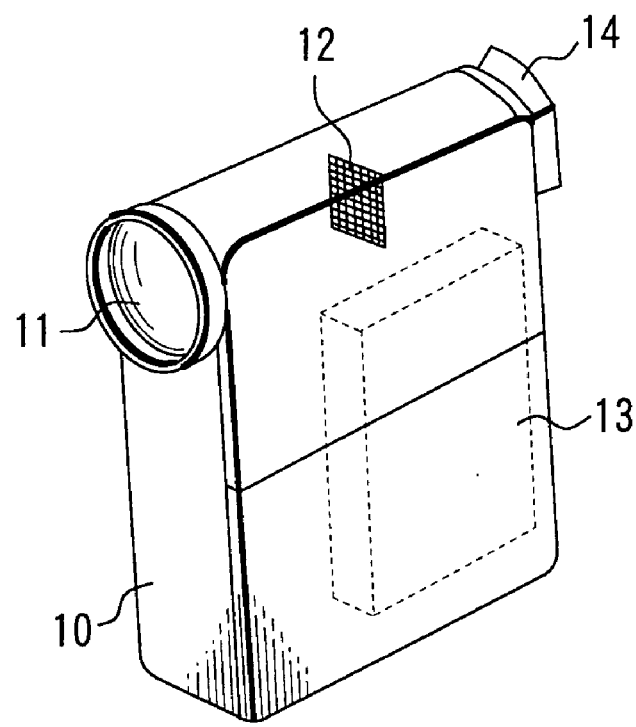
FIG. 35 shows a schematic diagram illustrating main portions of a video camera with the zoom lens according to the respective embodiments.

In FIG. 35, a reference numeral 10 denotes a video camera body, a reference numeral 11 denotes an image-taking optical system having the zoom lens according to the above embodiments, and a reference numeral 12 denotes a solid-state image-pickup element (photoelectric conversion element) such as a CCD sensor, a CMOS sensor, etc. for receiving an object image taken by the image-taking optical system 11. A reference numeral 13 denotes a memory for storing image data obtained with photoelectric conversion by the image-pickup element 12 and a reference numeral 14 denotes a finder for observing the object image displayed on a display element, which is not shown.

The display element comprises a liquid crystal panel, etc. and displays the object image taken by the image-pickup element 12.

Figure 36:
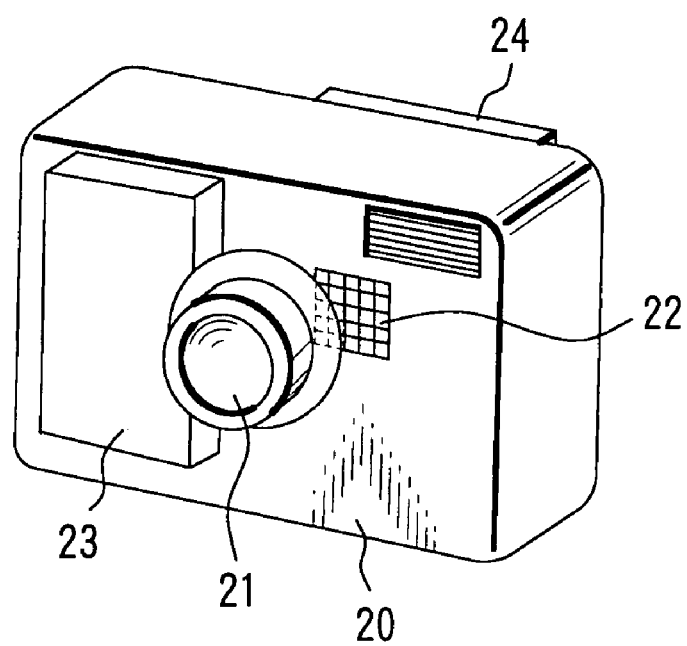
FIG. 36 shows a schematic diagram illustrating main portions of a digital camera with the zoom lens according to the respective embodiments.
Figure 37:
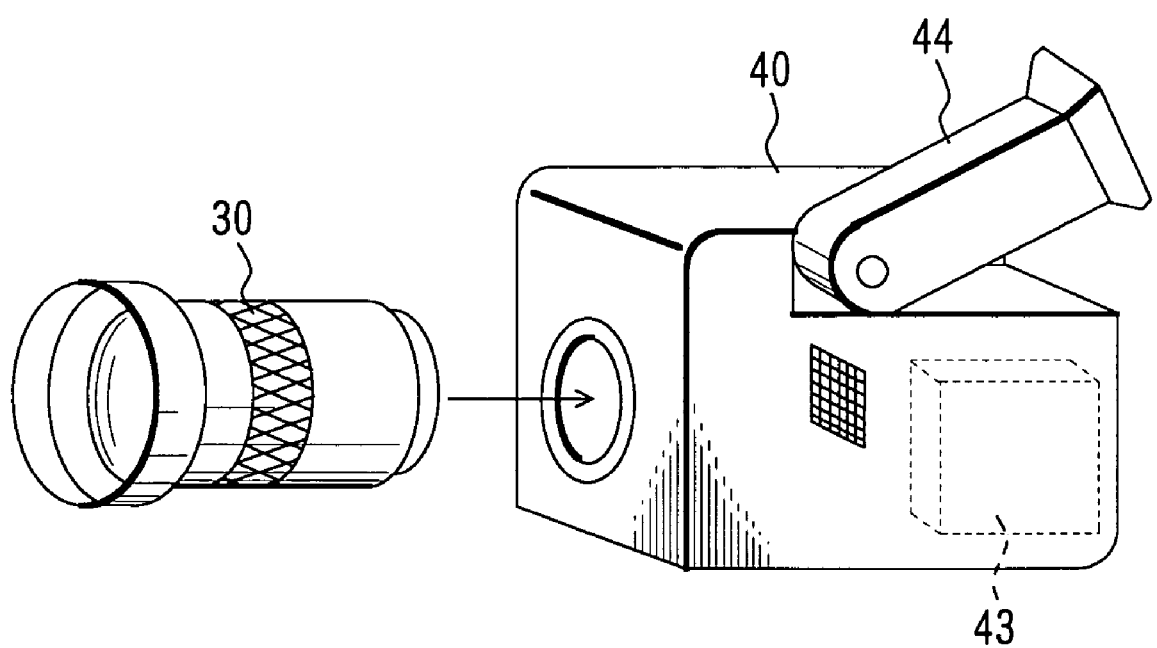
FIG. 37 shows a schematic diagram illustrating main portions of a video camera system employing the zoom lens according to the respective embodiments.

In FIG. 36, a reference numeral 20 denotes a camera body, a reference numeral 21 denotes an image-taking optical system having the zoom lens according to the above embodiments, and a reference numeral 22 denotes a solid-state image-pickup element (photoelectric conversion element) such as a CCD sensor, a CMOS sensor, etc. which is built in the camera body 20 and receives an object image formed by the image-taking optical system 21.

A reference numeral 23 is a memory for storing image data obtained with photoelectric conversion by the image-pickup element 22 and a reference numeral 24 denotes a finder which has a liquid crystal display panel, etc. and is used to observe the object image taken by the image-pickup element 22.

In FIG. 37, a reference numeral 30 denotes an interchangeable lens constructed as an image-taking optical system by the zoom lens according to the above embodiments and a reference numeral 40 denotes a video camera body which is mounted with the interchangeable lens 30. A reference numeral 42 denotes a solid-state image-pickup element (photoelectric conversion element) such as a CCD sensor, a CMOS sensor, etc. which is built in the video camera body 40 and receives an object image formed by the interchangeable lens 30.

A reference numeral 43 denotes a memory for storing image data obtained with photoelectric conversion by the image-pickup element 42 and a reference numeral 44 denotes an electronic view-finder which has a liquid crystal display panel, etc. and is used to observe the object image taken by the image-pickup element 42.

As explained above, by applying the zoom lens according to the above embodiments to the image-taking system such as a video camera, etc., it is possible to realize an image-taking system having a small size and high optical performance.

The present invention is not limited to the above-mentioned embodiments, but may be appropriately modified without departing from the scope and spirit of the present invention read from the claims and the specification.

This application claims priorities from Japanese Patent Applications No. 2003-376925 filed on Nov. 6, 2003 and No. 2003-386906 filed on Nov. 17, 2003, which are hereby incorporated by reference herein.

What is claimed is:

1. A zoom lens comprising, in order from an object side to an image side:

a first lens unit having a positive optical power, a second lens unit having a negative optical power, a third lens unit having a negative optical power, a fourth lens unit having a positive optical power, and a fifth lens unit having a positive optical power, wherein the second lens unit and the third lens unit are moved during zooming and the fifth lens unit is moved during focusing, and the fifth lens unit consists of one negative lens element and two positive lens elements in order from the object side to the image side, and the following conditional expressions are satisfied:

$$0 < \alpha 5 < 0.35$$

$$1.85 < v5p/v5n$$

where $\alpha 5$ represents an incident reduced tilt angle of an axial marginal ray to the fifth lens unit in a case where it is normalized to an optical power $\phi w$ at a wide-angle end of the whole system of zoom lens, $v5p$ represents an average value of Abbe's numbers of materials of the positive lens elements of the fifth lens unit, $v5n$ is an Abbe's number of a material of the negative lens element of the fifth lens unit.

2. The zoom lens according to claim 1, wherein the following conditional expression is satisfied:

$$0 < -\{(hb5-1)/\alpha b5' + hb5/(\alpha b5' - \phi 5 \cdot hb5)\} \cdot fw/30 < 1$$

where in an in-focus state with respect to an object at infinity, fw (mm) represents a focal length at the wide-angle end of the whole system of the zoom lens, $\phi 5$ represents an optical power of the fifth lens unit in a case where normalized to the optical power $\phi w$ (1/mm) at the wide-angle end of the whole system of the zoom lens, $\alpha b5'$ represents an emergent reduced tilt angle of an off-axial principal ray of the fifth lens unit, and hb5 represents an incident height of the off-axis principal ray at the fifth lens unit.

3. The zoom lens according to claim 1, wherein the fourth lens unit includes at least two positive lens elements and one negative lens element, and the following conditional expressions are satisfied:

$$1.0 < \nu 4p/\nu 4n < 1.7$$

$$0.18 < N4n - N4p$$

where ν4p and N4p represent respectively average values of Abbe's numbers and refractive indexes of materials of the two positive lens elements of the fourth lens unit, and ν4n and N4n represent respectively an Abbe's number and a refractive index of a material of the negative lens element of the fourth lens unit.

4. The zoom lens according to claim 1, wherein the fourth lens unit includes at least one positive lens element, one negative lens element, and one positive lens element in order from the object side to the image side.

5. The zoom lens according to claim 1, wherein the following conditional expression is satisfied:

$$0.023 < \phi 4/fw$$

where φ4 (1/mm) represents an optical power of the fourth lens unit in a case where normalized to the optical power φw at the wide-angle end of the whole system of the zoom lens, and fw (mm) represents a focal length at the wide-angle end of the whole system of the zoom lens.

6. The zoom lens according to claim 1, wherein the fifth lens unit is moved during auto focusing and the first lens unit is moved during manual focusing.

7. The zoom lens according to claim 1, wherein the zoom lens is an optical system which forms an image on an image-pickup element.

8. An image-taking system comprising:
the zoom lens according to claim 1; and
an image-pickup element which receives an image formed by the zoom lens.

9. A zoom lens comprising, in order from an object side to an image side:
a first lens unit having a positive optical power, a second lens unit having a negative optical power, a third lens unit having one of positive and negative optical powers, and a fourth lens unit having a positive optical power,
wherein the second lens unit and the third lens unit are moved during zooming, and
the fourth lens unit includes a 4a lens sub-unit, a 4b lens sub-unit, and a 4c lens sub-unit in order from the object side to the image side: a focusing is performed by moving the 4b lens sub-unit, and the following conditional expression is satisfied:

$$1 < |\beta 4c|$$

where β4c represents an image-forming magnification of the 4c lens sub-unit.

10. The zoom lens according to claim 9, wherein the third lens unit has a negative optical power, and
during zooming from a wide-angle side to a telephoto side, the second lens unit is moved from the object side to the image side and the third lens unit is moved to the object side and then moved to the image side.

11. The zoom lens according to claim 9, wherein the third lens unit has a positive optical power,
during zooming from the wide-angle side to the telephoto side, the second lens unit is moved from the object side to the image side, and the third lens unit is moved from the image side to the object side, and during the zooming operation, the zoom lens goes through a zoom state where an image-forming magnification is −1.

12. The zoom lens according to claim 9, wherein the following conditional expression is satisfied:

$$1 < |(1-\beta 4b^2) \cdot \beta 4c^2|$$

where β4b represents an image-forming magnification of the 4b lens sub-unit.

13. The zoom lens according to claim 9, wherein, during focusing, one of the whole of the first lens unit and a part of the first lens unit is moved.

14. The zoom lens according to claim 13, wherein a flange back adjustment is performed by moving one of the whole of the fourth lens unit and a part of the fourth lens unit.

15. The zoom lens according to claim 13, wherein, in a case where a position x of the first lens unit on the optical axis satisfies the following conditional expression, the focusing by the 4b lens sub-unit is performed:

$$|(x-x0) \cdot (\beta 234)^2/(\delta F)| < 1$$

where β represents an image-forming magnification at an arbitrary zoom position of the whole system, β1 represents an image-forming magnification of the first lens unit, x0 represents a reference position of the first lens unit in a case where β=0 and β1=0 in a state where the focusing by the 4b lens sub-unit is not performed, β234 represents a combined image-forming magnification from the second lens unit through the fourth lens unit, F is an F number of the whole system of zoom lens, and δ is a minimum diameter of a confusion circle.

16. The zoom lens according to claim 9, wherein the fourth lens unit includes an image-size conversion optical system, which can be inserted into or removed from an optical path of the zoom lens, closer to the object side than the 4b lens sub-unit, and the following conditional expression is satisfied:

$$\beta sh < 1$$

where βsh represents a conversion magnification of the image-size conversion optical system.

17. The zoom lens according to claim 16, wherein the following conditional expression is satisfied:

$$0.9 < shmax/(\beta sh^2 \cdot smax) < 1.1$$

where shmax represents a maximum movable amount of the 4b lens sub-unit when the image-size conversion optical system is inserted into the optical path, and smax represents a maximum movable amount of the 4b lens sub-unit when the image-size conversion optical system is not inserted into the optical path.

18. The zoom lens according to claim 9, wherein the 4b lens sub-unit has a positive optical power and the 4c lens sub-unit has a negative optical power, and the following conditional expression is satisfied:

$$-0.3 < \beta 4b < 0.3$$

where β4b represents an image-forming magnification of the 4b lens sub-unit.

19. The zoom lens according to claim 18, wherein the 4c lens sub-unit consists of one lens element having a negative optical power.

20. The zoom lens according to claim 9, wherein the zoom lens is an optical system which forms an image on an image-pickup element.

21. An image-taking system comprising:
the zoom lens according to claim 9; and
an image-pickup element which receives an image formed by the zoom lens.

* * * * *

UNITED STATES PATENT AND TRADEMARK OFFICE
CERTIFICATE OF CORRECTION

| | |
|---|---|
| PATENT NO. | : 6,987,622 B2 |
| APPLICATION NO. | : 10/980342 |
| DATED | : January 17, 2006 |
| INVENTOR(S) | : Ryuji Nurishi |

It is certified that error appears in the above-identified patent and that said Letters Patent is hereby corrected as shown below:

COLUMN 2
Line 37, "close" should read --close to--.
Line 62, "H11-305124" should read --H11-305124.--.

COLUMN 3
Line 43, "comprised" should read --comprised of--.

COLUMN 4
Line 48, "zooming" should read --zooming.--.

COLUMN 7
Line 36, "a" should read --an--.

COLUMN 19
Line 24, "ear" should read --in the rear--.
Line 38, "to an" should read --to a--.

COLUMN 22
Line 43, "a image-taking" should read --an image-taking--.

COLUMN 23
Line 20, "(33)" should read --        (33)--.
Line 43, "mean time," should read --meantime,--.

COLUMN 24
Line 61, "expression." should read --expression:--.

UNITED STATES PATENT AND TRADEMARK OFFICE
CERTIFICATE OF CORRECTION

PATENT NO. : 6,987,622 B2
APPLICATION NO. : 10/980342
DATED : January 17, 2006
INVENTOR(S) : Ryuji Nurishi It is certified that error appears in the above-identified patent and that said Letters Patent is hereby corrected as shown below:

COLUMN 30
Line 38, "d26=8.58" should read --d26=6.58--.
Line 42, "r30=-82.819 d30=-8.19" should read --r30=-82.319 d30=6.19--.

Signed and Sealed this

Second Day of January, 2007

JON W. DUDAS
*Director of the United States Patent and Trademark Office*